United States Patent
Watanabe et al.

(10) Patent No.: US 6,529,461 B1
(45) Date of Patent: *Mar. 4, 2003

(54) DISK APPARATUS HAVING A CONTACTING MEMBER CONTACTING AN OUTERMOST AREA OF A DISK FOR PROTECTING THE DISK FROM DAMAGE DUE TO A SHOCK

(75) Inventors: Takashi Watanabe, Ichikawa (JP); Nobuki Matsui, Oume (JP)

(73) Assignee: Teac Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,464

(22) Filed: Sep. 29, 1997

Related U.S. Application Data

(63) Continuation-in-part of application No. 08/629,616, filed on Apr. 9, 1996, now abandoned.

(30) Foreign Application Priority Data

Jul. 26, 1995 (JP) .............................................. 7-190740
Sep. 30, 1996 (JP) .............................................. 8-259896

(51) Int. Cl.[7] ............................................. G11B 17/04
(52) U.S. Cl. ................................................... 369/75.2
(58) Field of Search .......................... 360/97.04, 98.08, 360/99.05, 133; 369/270, 271, 75.1, 75.2, 77.1

(56) References Cited

U.S. PATENT DOCUMENTS

| | | | | |
|---|---|---|---|---|
| 4,068,851 A | * | 1/1978 | Yamamura | 369/270 |
| 4,171,531 A | * | 10/1979 | Grapes et al. | 360/99.05 |
| 4,234,195 A | * | 11/1980 | Shibata | 369/270 |
| 4,322,841 A | * | 3/1982 | Borchard et al. | 369/271 |
| 4,390,979 A | * | 6/1983 | Saito et al. | 369/270 |
| 4,481,619 A | * | 11/1984 | Oozeki | 369/270 |
| 4,507,774 A | * | 3/1985 | Marchant | 369/271 |
| 4,839,760 A | * | 6/1989 | Yamada et al. | 360/97.01 |
| 4,841,516 A | * | 6/1989 | Ohmori et al. | 369/271 |
| 5,084,861 A | * | 1/1992 | Takahashi | 360/133 |
| 5,150,353 A | * | 9/1992 | Schnorr et al. | 369/270 |
| 5,238,107 A | * | 8/1993 | Kownacki | 206/310 |
| 5,637,200 A | * | 6/1997 | Tsymberov | 369/270 |
| 5,808,996 A | * | 9/1998 | Aoyama | 369/77.1 |
| 5,793,729 A | * | 11/1998 | Soga et al. | 369/77.1 |

FOREIGN PATENT DOCUMENTS

| | | | | |
|---|---|---|---|---|
| JP | 58-12177 | * | 1/1983 | 360/99.05 |
| JP | 59-188876 | | 10/1984 | |
| JP | 63-311681 | * | 12/1988 | |
| JP | 64-8544 | | 12/1989 | |
| JP | 5-298798 | | 11/1993 | |
| JP | 8-17118 | | 1/1996 | |

* cited by examiner

Primary Examiner—Brian E. Miller
(74) Attorney, Agent, or Firm—Anderson, Kill & Olick P.C.

(57) ABSTRACT

A disk apparatus which can prevent a disk from being damaged when a shock is applied to the disk apparatus is provided. A disk is rotatably supported in a space formed between a tray and a cover when the disk is loaded in the disk apparatus. A contacting member is provided in the space so that the contacting member contacts an outermost annular area of a surface of the disk when the disk is warped. The outermost annular area is a non-recordable area which is adjacent to a rim of the disk.

22 Claims, 19 Drawing Sheets

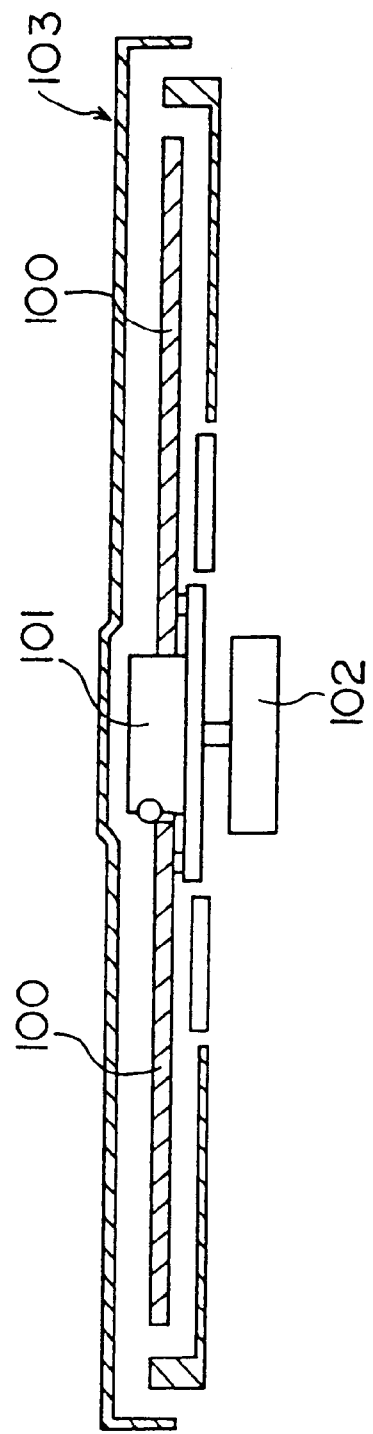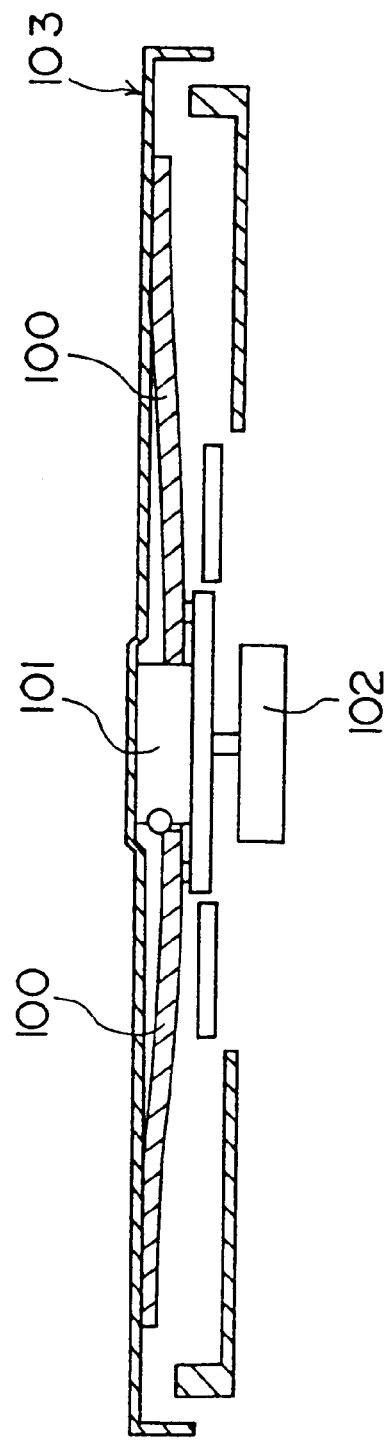

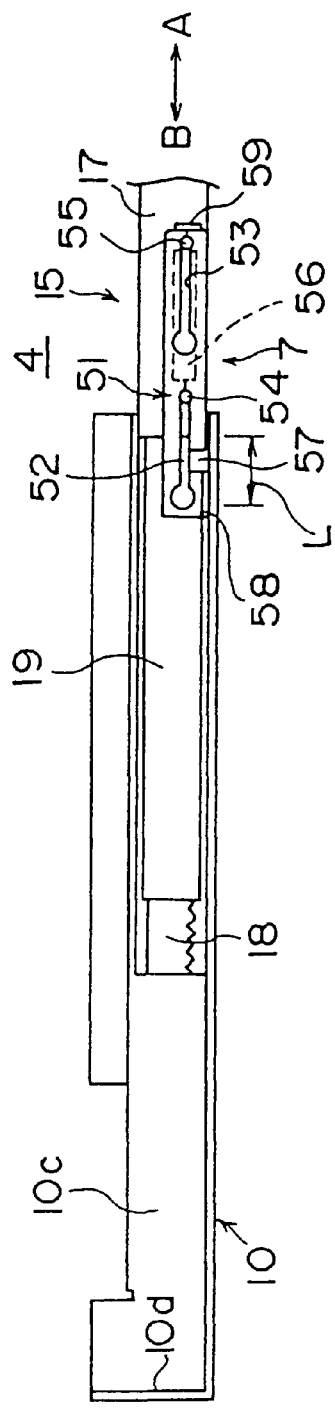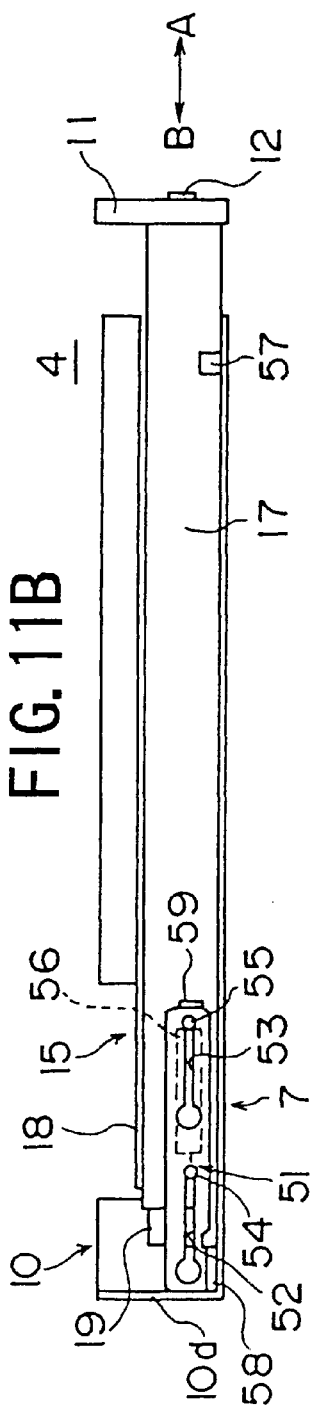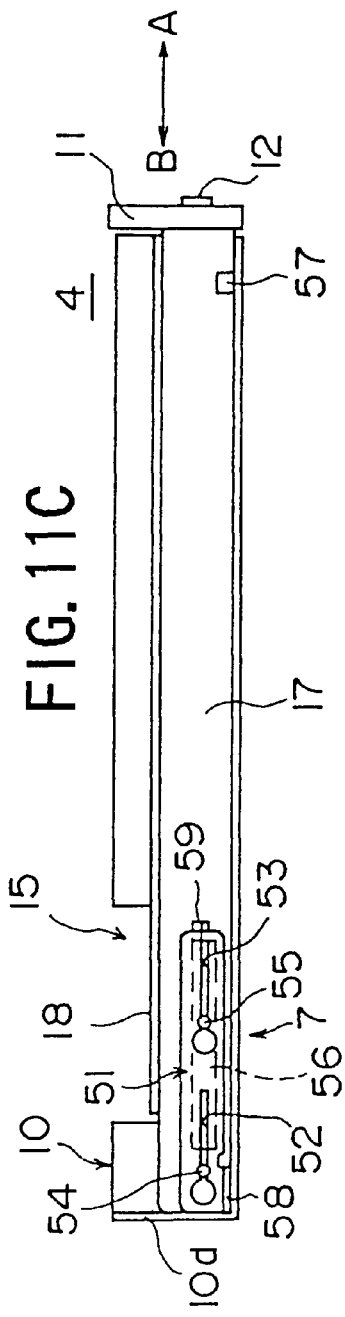

DISK APPARATUS HAVING A CONTACTING MEMBER CONTACTING AN OUTERMOST AREA OF A DISK FOR PROTECTING THE DISK FROM DAMAGE DUE TO A SHOCK

CROSS REFERENCE TO RELATED APPLICATION

This application is continuation-in-part of the application, Ser. No. 08/629,616 filed on Apr. 19, 1996, for DISK APPARATUS FOR PROTECTING A DISK FROM SHOCK.

BACKGROUND OF THE INVENTION

1. Field of the Invention

The present invention generally relates to a disk apparatus and, more particularly, to a disk apparatus such as a CD-ROM drive apparatus which is incorporated into a notebook type personal computer and the like.

2. Description of the Related Art

A compact disk (12-cm dia. or 8-cm dia), which is reproduced or read by means of a laser type pick-up, has become used as a recording medium recording information such as, for example, database or software. A component type disk apparatus (CD-ROM drive apparatus) has been developed so that the CD-ROM drive apparatus can be incorporated into a miniaturized notebook type personal computer.

In a conventional disk apparatus, a tray on which a disk is placed is driven by a motor. A disk is placed on a turntable in the tray when the tray is moved out of a chassis, and then the tray is moved into the chassis of frame of the computer by a driving force of a motor.

In the method in which the tray is driven by a motor as mentioned above, the motor for driving the tray and a transmission mechanism for transmitting the driving force to the tray are needed. Thus, it was difficult to reduce the size and thickness of the disk apparatus, and it was not possible to incorporate the disk apparatus inside a chassis of a notebook type personal computer.

In order to solve the above-mentioned problem, a disk apparatus having no motor and transmission mechanism has been developed in which the tray is moved between a disk loading position inside the chassis and a disk replacing position outside the chassis.

An example of a disk drive of this type is shown in FIG. 1A. In the figure, a disk 100 is placed on a turntable 101 provided in the disk apparatus. The turn table 101 is directly mounted on a rotational shaft of a disk motor 102 so that the disk 100 on the turn table 101 is rotated at a predetermined rotational speed by a driving force generated by the disk motor 102. Additionally, a cover 103 is provided on an upper portion of a chassis so that no dust enters into the disk apparatus.

The disk apparatus incorporated into the notebook type personal computer tends to receive stronger shocks than a disk apparatus incorporated into a desk-top type personal computer. When no shock is applied to the disk apparatus, as shown in FIG. 1A, the disk 100 is maintained to be flat with no warp. However, if a shock is applied in up and down directions (an axial direction of the disk motor 102), the disk 100 may warp as shown in FIG. 1B, resulting in a wide area of the disk 100 contacting the cover 103.

Generally, a surface of the disk 100, which faces the cover 103, is printed with information with regard to contents recorded on the disk 100. Thus, if the disk 100 makes contact with the cover 103 due to a shock while the disk 100 is being rotated, the printed material may be scratched off from the contacting portion, and thus there may be a problem in that the disk 100 cannot be identified by the print material.

Additionally, the disk 100 has a construction in which opposite sides of a reflection surface reflecting a laser beam are protected by plastic layers. Since the plastic layer on an upper side of the disk 100 has only a thickness of 30 $\mu$m, the plastic layer may be shaved if the disk 100 slides on the cover 103. This may result in a problem that the data recorded on the disk 100 is destroyed.

SUMMARY OF THE INVENTION

It is a general object of the present invention to provide an improved and useful disk apparatus in which the above-mentioned problems are eliminated.

A more specific object of the present invention is to provide a disk apparatus which can prevent a disk from being deteriorated when the disk is warped due to a shock applied to the disk apparatus.

There is provided according to the present invention a disk apparatus for driving a disk-like recording medium, comprising:

a space in which the recording medium is rotatably supported when the recording medium is loaded in the disk apparatus; and a contacting member provided in the space so as to be opposite to an outermost annular area of a surface of the recording medium, the outermost annular area having a predetermined width and adjacent to a rim of said recording medium, the contact member being positioned adjacent to the outermost annular area so that the contacting member is adapted to contact only the outermost annular area when the recording medium is warped, the surface being perpendicular to a rotational axis of the recording medium.

In one embodiment according to the present invention, the predetermined width of the annular outermost area is less than a width of a non-recordable area of the surface of the recording medium which non-recordable area is adjacent to the rim of the recording medium and is not used for recording, the predetermined width of the outermost annular area and the width of the non-recordable area are measured in a radial direction of the recording medium.

The space may be defined between a tray on which the recording medium is placed and a cover covering the tray, and the contacting member is provided on the cover. The contacting member mat be a part of the cover and the contacting member protrudes toward the tray. Additionally, the cover may be made of a metal plate such as a steel plate. The contacting member may be a bead formed in the cover.

According to the present invention, the contacting member, which may be a bead protruding toward the recording medium in the tray, contacts the recording medium when the recording medium warps due to a shock applied to the disk apparatus. Since the contacting member contacts the outermost annular area of the recording medium, no print is scratched off from the printed surface (front surface) of the recording medium even if the recording medium is warped during operations and contacts the contacting member.

Additionally, since the contacting member contacts the outermost annular area of the recording medium, in which outermost annular area no data is recorded, no influence is provided to the data recorded on the recording medium. This results in a positive reproduction of the data recorded on the recording medium.

In one embodiment according to the present invention, the contacting member may be a part of the tray so that the contacting member faces the recording medium when the recording medium is loaded in the disk apparatus.

Additionally, the contacting member may include a first part formed on the cover and a second part formed on the tray so that the first part and the second part face the recording medium.

Further, the contacting member may be integrally formed with a member defining the space. Additionally, the predetermined width of the outermost annular area is less than a width of a non-recordable area of the surface of the recording medium which non-recordable area is adjacent to the rim of the recording medium and is not used for recording, the predetermined width of the outermost annular area and the width of the non-recordable area measured in a radial direction of the recording medium.

Other objects, features and advantages of the present invention will become more apparent from the following detailed description when read in conjunction with the accompanying drawings.

BRIEF DESCRIPTION OF THE DRAWINGS

FIG. 1A is an illustrative cross-sectional view of a conventional disk apparatus;

FIG. 1B is an illustrative cross-sectional view of the disk apparatus shown in FIG. 1A in a state where a shock is applied to the disk apparatus;

FIGS. 11A, 11B and 11C are illustrations for explaining an operation of the engaging mechanism;

DETAILED DESCRIPTION OF THE PREFERRED EMBODIMENTS

A description will now be give of a first embodiment of the present invention.

Figure 2:
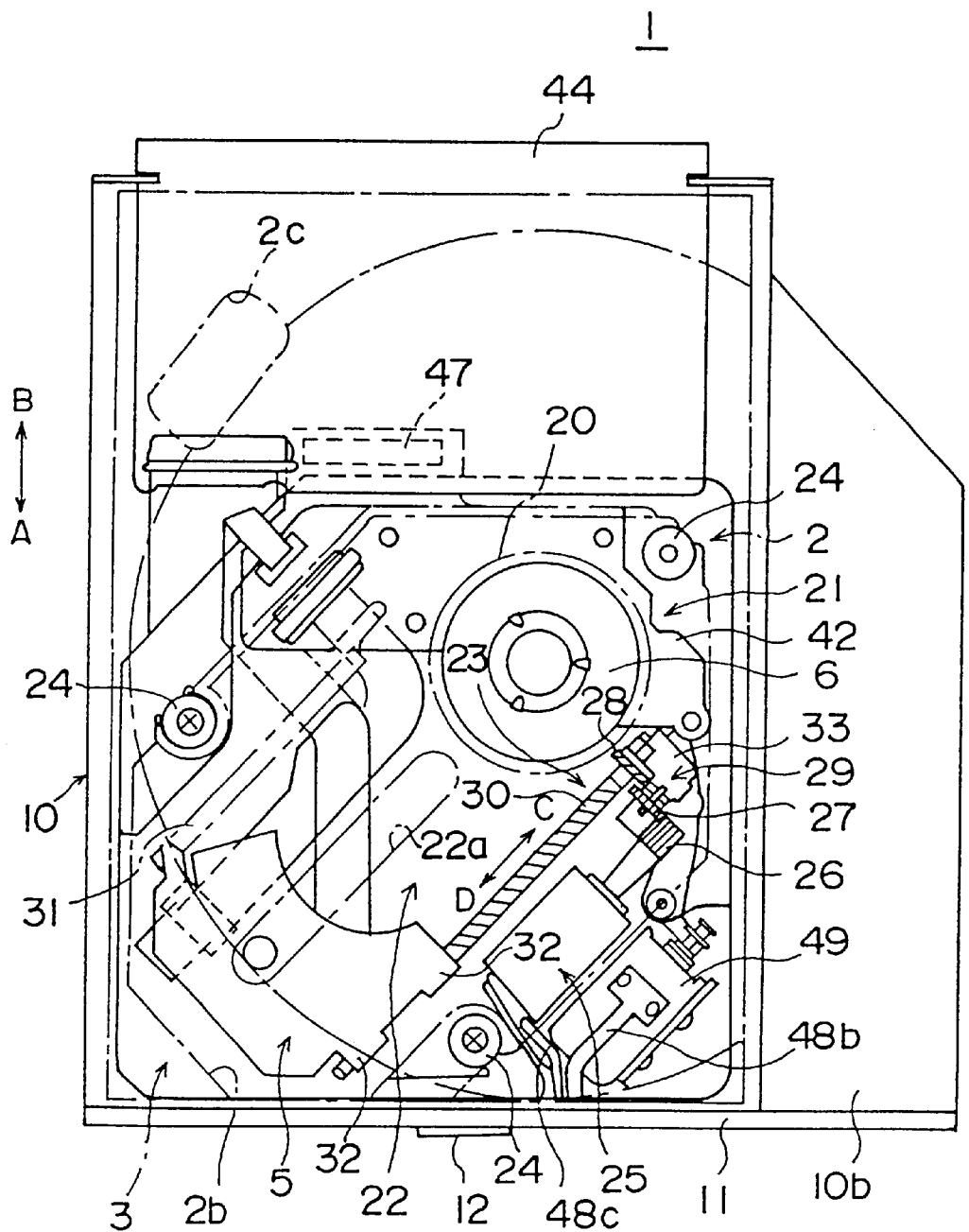
FIG. 2 is a plan view of a disk apparatus according to a first embodiment of the present invention.
Figure 3:
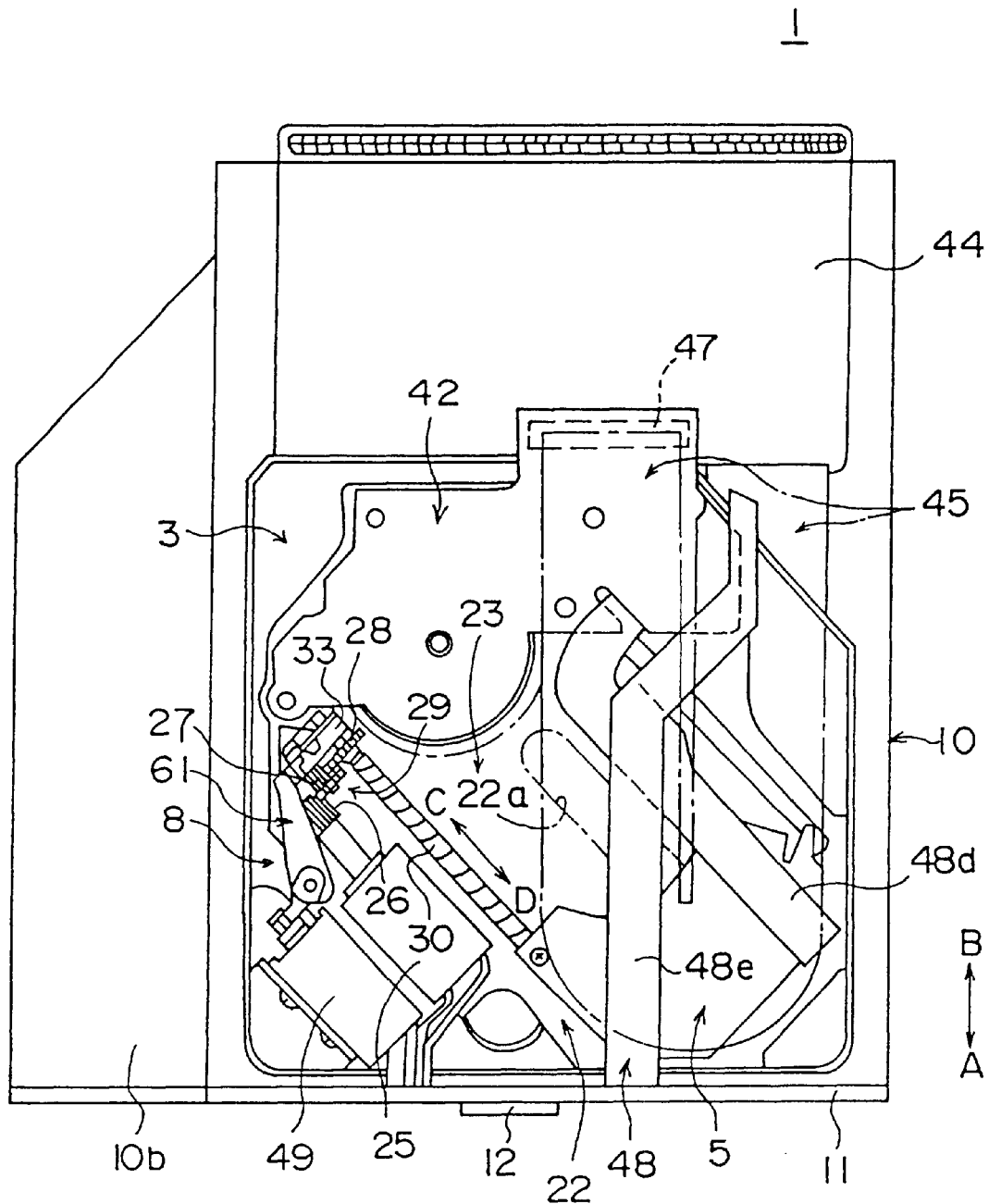
FIG. 3 is a bottom view of the disk apparatus shown in FIG. 2.
Figure 4:
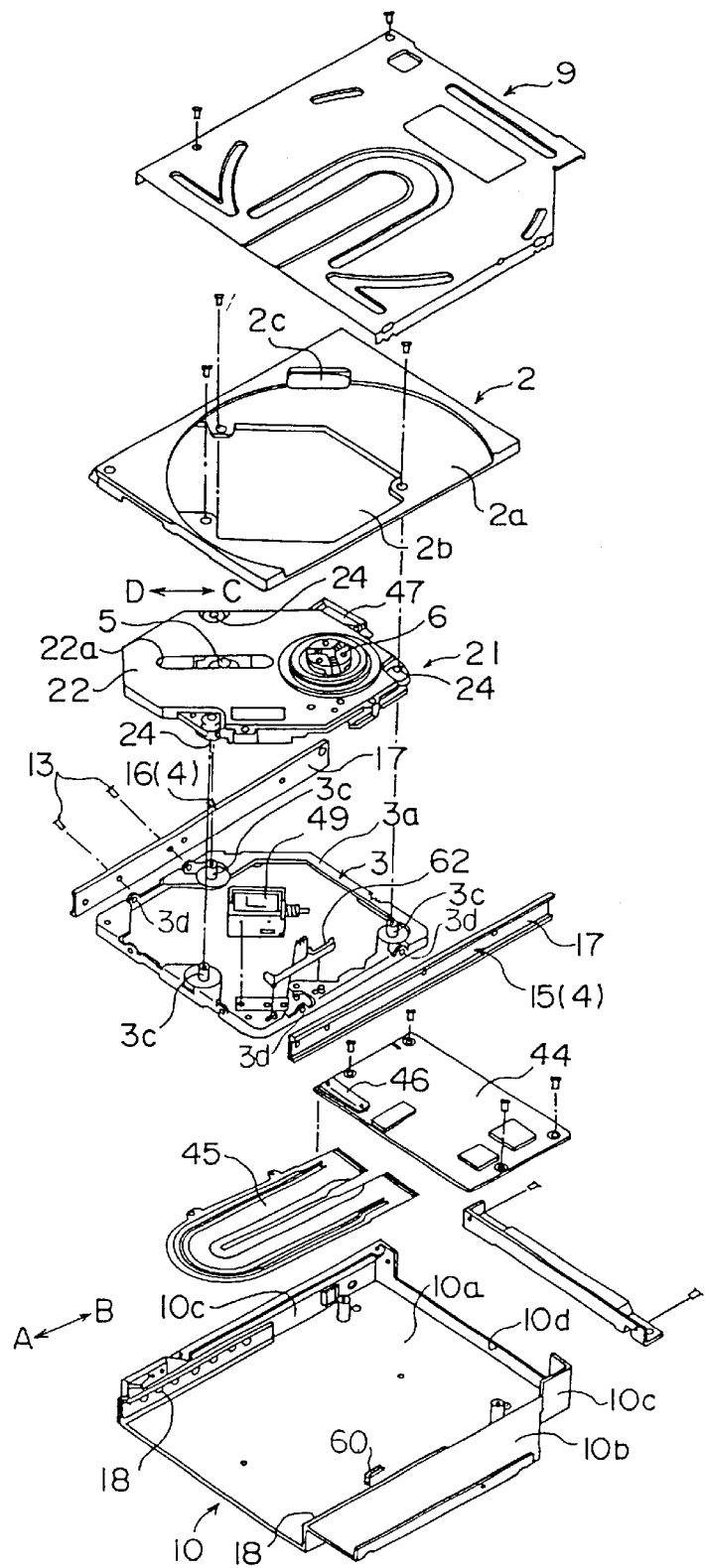
FIG. 4 is an exploded perspective view of the disk apparatus shown in FIG. 2.

FIGS. 2 to 4 illustrate a disk apparatus according to the first embodiment of the present invention. In each figure, a CD-ROM drive apparatus 1 (hereinafter referred to as an apparatus 1) is a component type apparatus which is incorporated into a housing of a notebook type personal computer (not shown). FIG. 2 is a plan view of the apparatus 1; FIG. 3 is a bottom view of the apparatus 1; FIG. 4 is a perspective view of the apparatus 1.

The apparatus 1 generally comprises a tray 2 for receiving a disk (not shown); a sub-chassis 3 supporting the tray 2; a tray sliding mechanism 4 slidably supporting the tray 2; an optical pick-up 5 provided on the sub-chassis 3; a turntable 6 rotating the disk (CD-ROM) placed thereon; an engaging mechanism 7 (shown in FIGS. 9 and 10) for engaging the tray 2 when the tray 2 moves to a disk replacing position; and a locking mechanism 8 for locking the tray 2 when the tray 2 moves to a disk loading position.

FIG. 2 shows a state where the tray 2 (indicated by chain lines in FIG. 2) is moved to a position (hereinafter referred to as a disk loading position) in which the disk is subjected to a reproduction process. FIG. 3 also shows a state, viewed from a bottom side, where the tray 2 is in the disk loading position.

The tray 2 is formed to have a width less than a diameter of the disk so that a portion of the disk protrudes from the tray 2. Additionally, the tray 2 is slidable by a manual operation in directions A and B by a tray sliding mechanism 4 explained later. In FIGS. 2 and 3, the tray 2 is inserted in the direction B, thus the tray is positioned in the disk loading position. The tray 2 is moved to a disk replacing position, in which the disk in the tray is replaceable, by drawing the tray 2 in the direction A.

As mentioned above, since the apparatus 1 is configured such that the tray 2 is manually moved in the directions A and B, the number of parts is reduced as compared to a conventional disk apparatus provided with a driving mechanism which may comprise a motor and a transmission mechanism.

The notation 10 indicates a chassis which comprises an accommodating portion 10a accommodating the above mentioned mechanisms and a cover portion 10b covering a projecting portion of the disk from underneath so as to protect the projecting portion. It should be noted that a space under the cover 10b is provided for other components of the notebook type personal computer.

The notation 11 indicates a front bezel which is fixed on a front end of the tray 2. Accordingly, the front bezel 11 moves together with the tray 2 in the directions A and B. A switch button 12 is provided in a center of the front bezel 11 so that a locking mechanism 8 is unlocked when the tray 2 is to be drawn or opened. Accordingly, when the switch button 12 is operated in a state shown in FIGS. 2 and 3, the front bezel 11 protrudes a predetermined distance in the direction A with respect to the chassis 10, which results in an easy drawing or opening operation of the tray 2.

The tray 2 comprises, as shown in FIG. 4, a disk facing surface 2a forming a space receiving the disk, an opening 2b formed on the disk facing surfaces 2a for allowing an access of a pick-up and a turn table, and an arc-like recess 2c into which a user's finger is inserted when picking up the disk placed on the tray 2.

The disk facing surface 2a has a lateral width less than the diameter of the disk so as to cover the accommodating portion 10a of the chassis 10. The disk facing surface 2a covers about two-thirds of the area of the disk. Thus, the apparatus 1 can be reduced in size.

Figure 12:
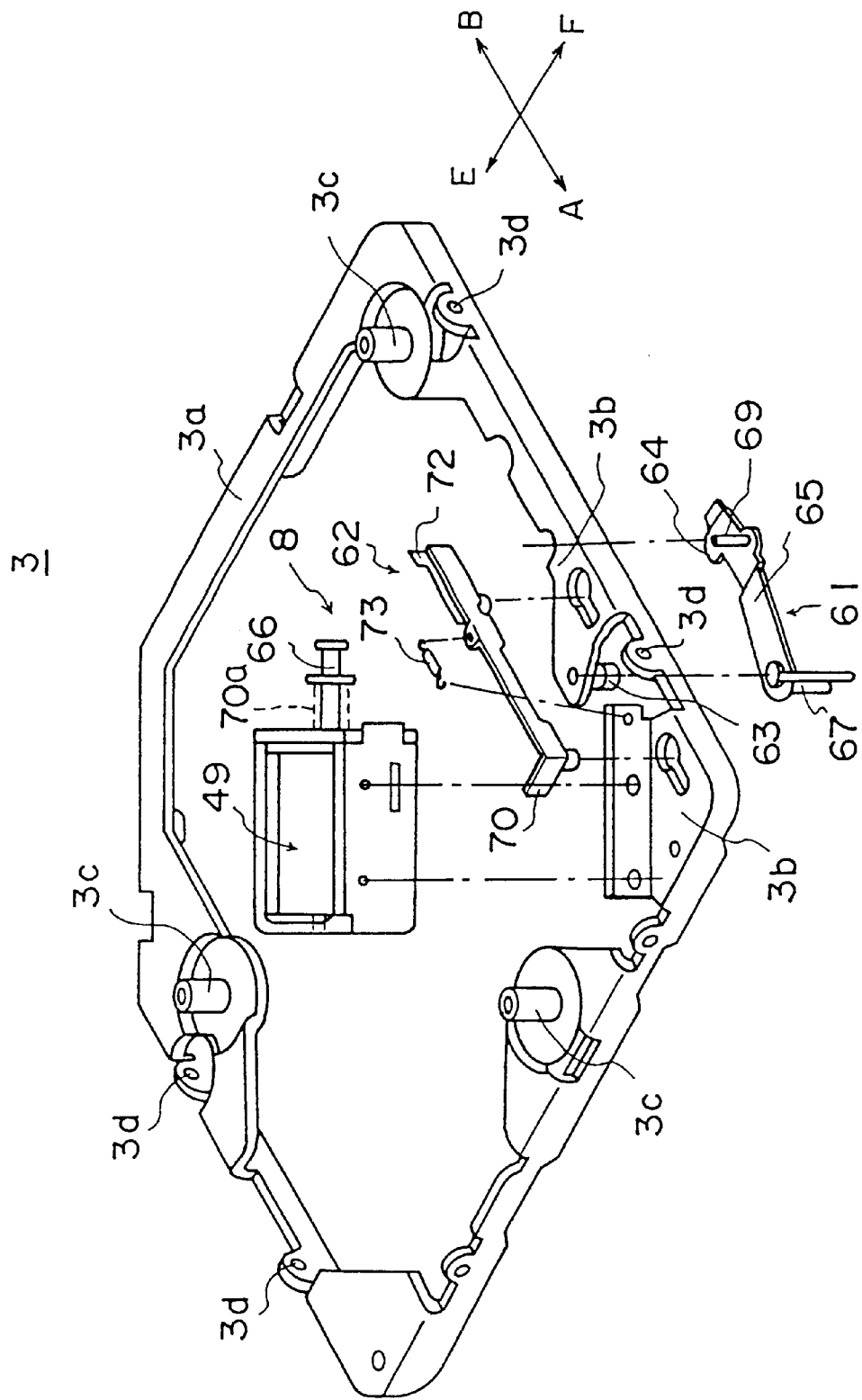
FIG. 12 is a perspective view for explaining the sub-chassis and a locking mechanism.
Figure 13:
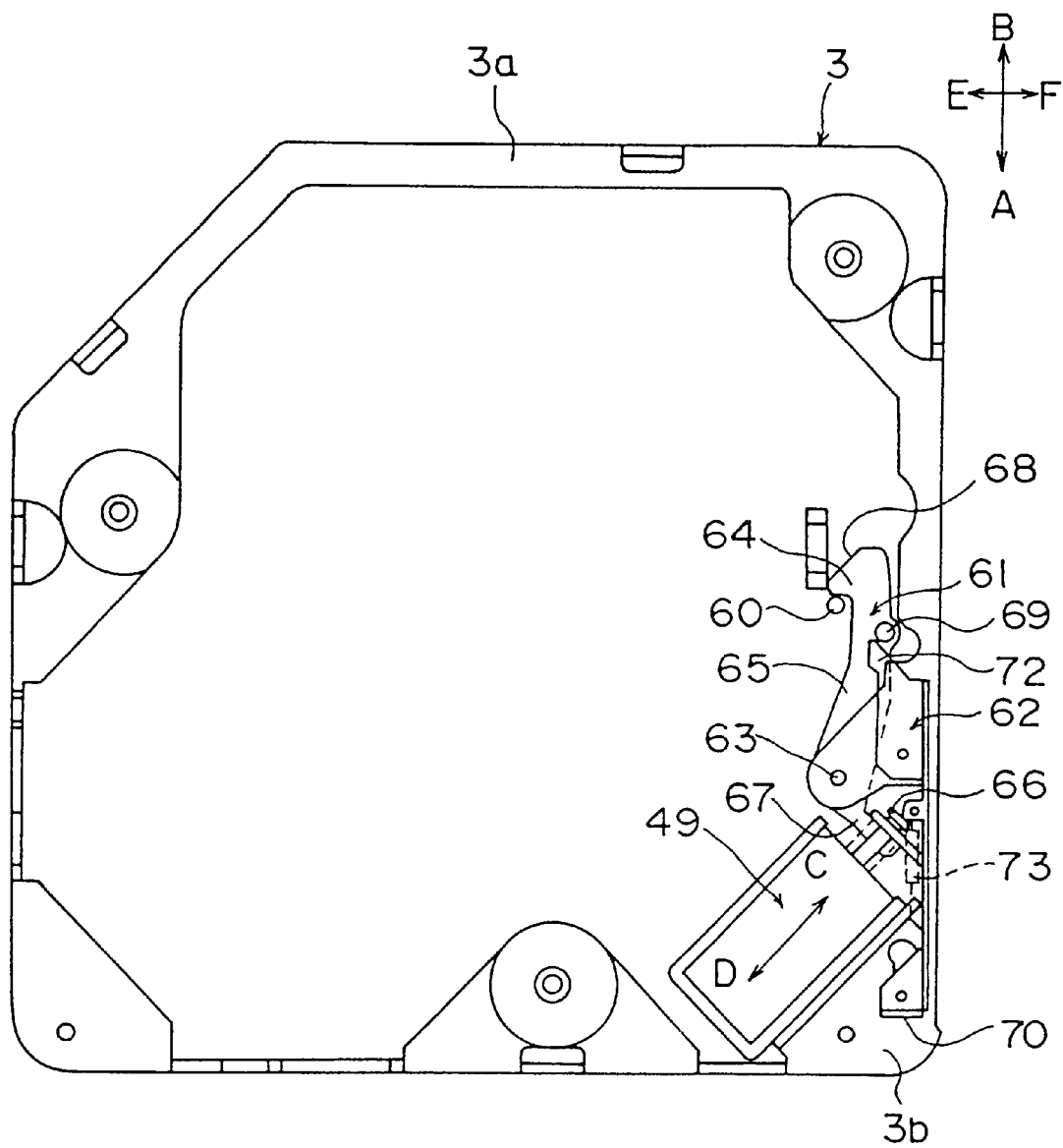
FIG. 13 is a plan view for explaining the sub-chassis and the locking mechanism.

The sub-chassis 3 comprises, as shown in FIGS. 4, 12 and 13, a square shaped frame member 3a on which the tray 2 is placed and a driving unit 21 having a pick-up 5 and a turn table 6 is provided; a locking mechanism receiving portion 3b provided with the locking mechanism 8 formed on the frame member 3a; a boss 3c for fixing the above-mentioned driving unit 21; and screw holes 3d for fixing a tray sliding mechanism 4.

The tray sliding mechanism 4 comprises, as shown in FIGS. 4, 5, 10, 11A, 11B and 11C, a pair of guide rail mechanisms 15 and 16 which are mounted on opposite sides of the sub-chassis 3, respectively. The guide rail mechanisms 15 and 16 are mounted on the sub-chassis 3 by screws 13 being screwed into respective screw holes 13a.

A description will now be given of the guide rail mechanisms 15 and 16. It should be noted that since the pair of guide rail mechanisms 15 and 16 are identical to each other, a description will be given of the slide rail mechanism 15 only. The guide rail mechanism 15 comprises a movable side rail 17 fixed on a bracket 3b of the sub-chassis 3; a stationary side rail 18 fixed on a side wall 10c of the chassis 10 and extending parallel to the movable side rail 17; and a slide rail 19 interposed between the movable side rail 17 and the stationary rail 18 so as to slidably engage with each of the rails 17 and 18.

Figure 5:
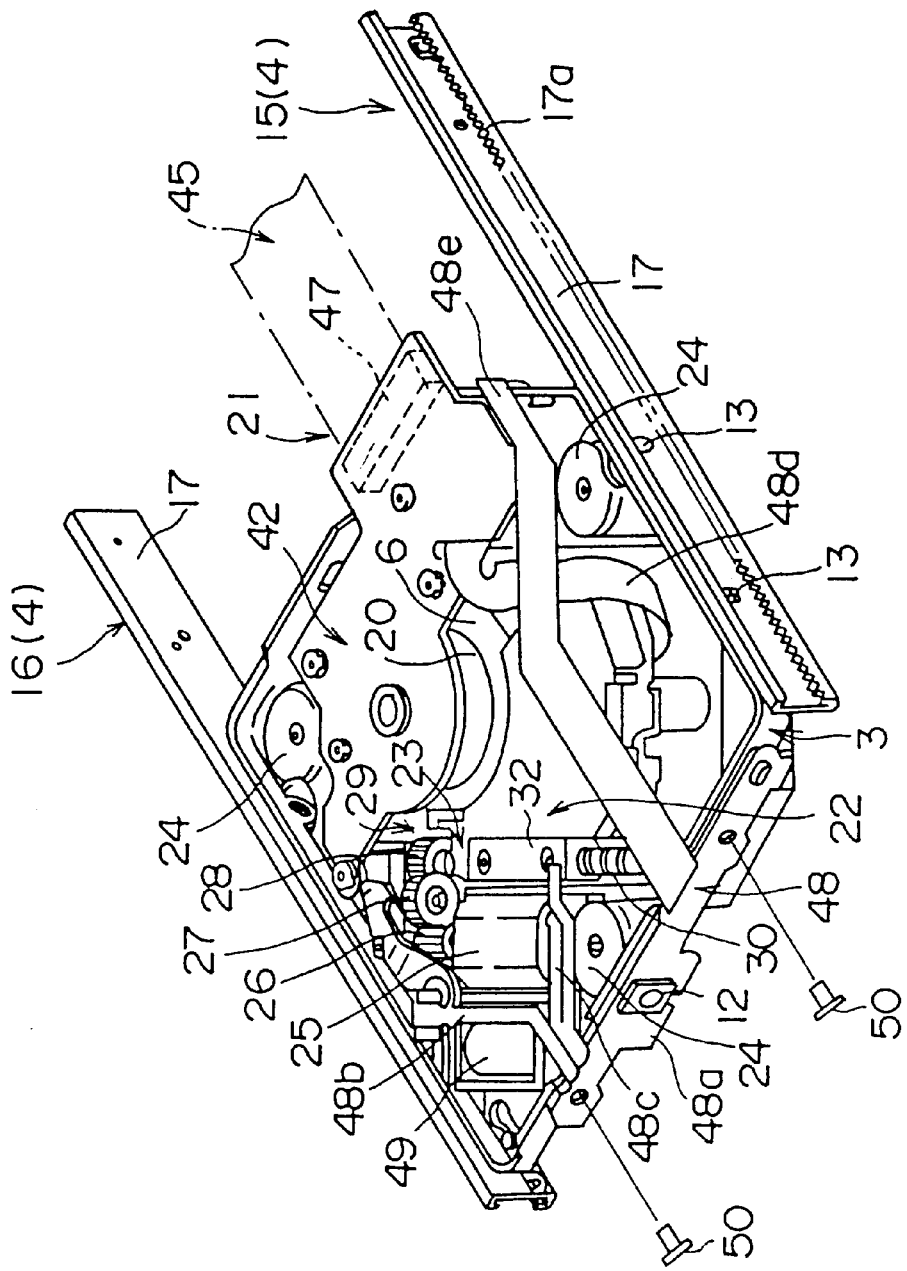
FIG. 5 is a perspective view of a sub-chassis provided with a driving unit.

The movable side rail 17 and the stationary side rail 18 have a cross-section having a C-shape, and are provided, on an end thereof, with a rack extending in a longitudinal direction, respectively (only a rack 17a is shown in FIG. 5). The slide rail 19 has a cross-section having an H-shape, and is engaged by the movable side rail 17 and the stationary side rail 18. Additionally, a pinion (not shown in the figure) is rotatably provided in an intermediate position in a longitudinal direction of the slide rail 19. The pinion engages with the racks formed on the movable side rail 17 and the stationary side rail 18.

Accordingly, when the tray 2 is drawn out, the stationary side rail 18 slides relative to the slide rail 19 in the direction A and the pinion is rotated. Thus, the slide rail 19 is moved in the direction A relative to the movable side rail 17 when the pinion is rotated. In the guide rail mechanism 15 according to the present embodiment, the movable side rail 17 travels a distance twice as long as that of the slide rail 19 since the slide rail 19, which is interposed between the movable side rail 17 and the stationary side rail 18, movably engages with the movable side rail 18 and the stationary side rail 18.

Accordingly, the guiding range of the guide rail mechanism 15 for guiding the tray 2 is extended, and the tray 2 is able to be positively supported in a range from. the disk loading position inside the chassis 10 to the disk replacing position outside the chassis 10. Additionally, when the tray 2 is positioned in the disk loading position, each of the rails 17, 18 and 19 is accommodated in the chassis 10 as shown in FIG. 11C.

When the tray 2 is drawn out, further travel of the tray 2 must be restricted when the tray 2 reaches the disk replacing position. Accordingly, an engaging mechanism 7 is provided in the apparatus 1 which stops the travel of the tray 2 beyond the disk replacing position in the direction A. The engaging mechanism 7 will be described later for the sake of convenience.

A description will now be given, with reference to FIGS. 2 to 6, of the driving unit 21 in which the pick-up up 5 and the turntable 6 are provided. As mentioned above, the driving unit 21 comprises a turntable 6; a base 22 mounted on an upper portion of the sub-chassis 3; a pick-up 5 movably mounted on the base 22; a pick-up driving unit 23 which moves the pick-up 5 in a radial direction of the disk; and a disk motor 20 rotating the turntable 6.

The tray 2 is mounted on an upper portion of the base 22 of the driving unit 21. A vibration insulator 24 absorbing vibration is interposed between the sub-chassis 3 and the base 22. Accordingly, vibration influence of the pick-up 5 and the turntable 6 mounted on the base 22 is reduced during the travel of the tray 2 since vibration is absorbed by the vibration insulator 24.

The base 22 is formed of a glass fiber mixed plastic so that the coefficient of thermal expansion of the base 22 is approximated to that of the pick-up 5 and the turntable 6. Accordingly, a dimensional relationship between the base 2 and each of the pick-up 5 and the turn table 6 can be maintained at a high level of accuracy when an environmental thermal condition is changed.

The pick-up driving unit 23 moves the pick-up 5 in directions C and D in the figures. The pick-up driving unit 23 integrally comprises a pick-up driving motor 25 provided on a reverse surface of the base 22 and having a gear 26 on a shaft thereof; a pick-up driving mechanism 29 provided with gears 27 and 28; a lead screw 30 driven by the pick-up driving mechanism 29; and a guide unit 31 for guiding the pick-up 5 by extending in a direction parallel to the lead screw 30.

In the above-mentioned structure, since the pick-up 5 has engaging portions 32 which engage with the lead screw 30, the pick-up 5 is moved in radial directions (directions C and D) of the disk when the pick-up driving motor 25 is rotated and thus the lead screw 30 is rotated via the pick-up driving mechanism 29. Additionally, an elongated hole 22a is formed in the base 22 at a position of which corresponds to the moving directions of the pick-up 5. Thus, the pick-up 5 can face the surface of the disk over an entire moving range.

Figure 7:
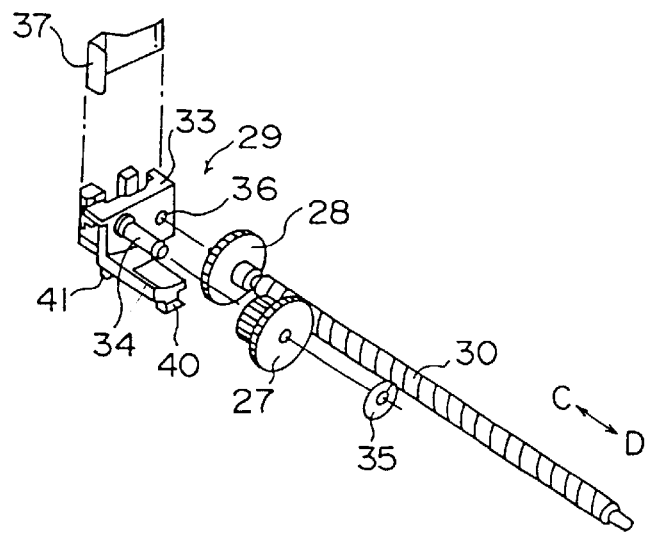
FIG. 7 is a perspective view of a pick-up driving mechanism.
Figure 8:
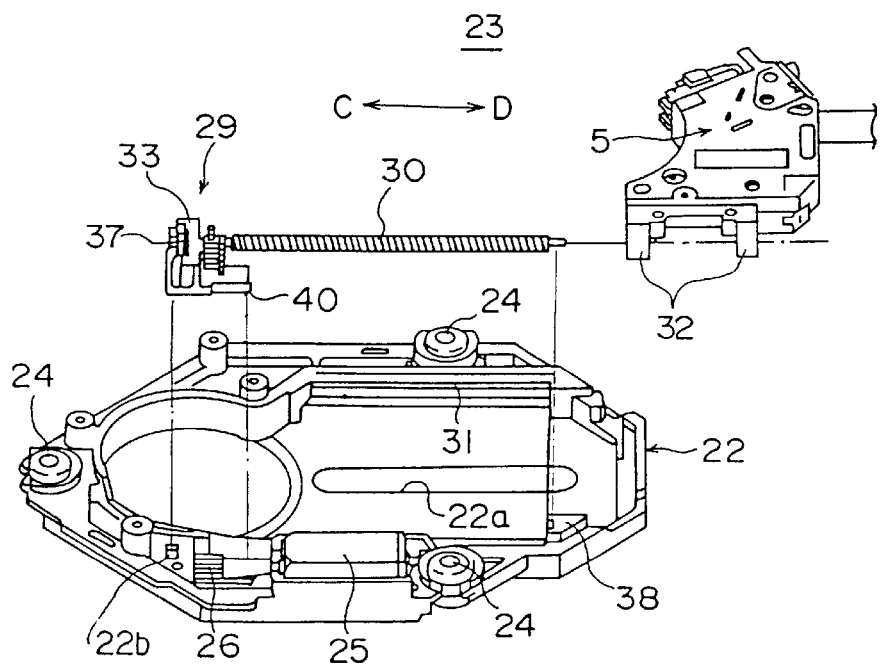
FIG. 8 is an exploded perspective view for explaining a mounting method of the pick-up driving mechanism to a base.
Figure 9A:
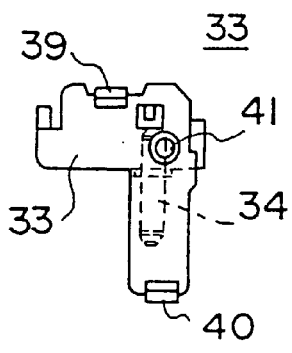
FIG. 9A is a plan view of a mounting holder.
Figure 9B:
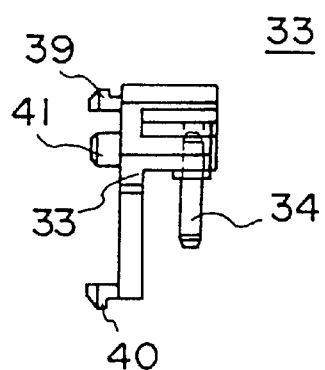
FIG. 9B is a side view of the mounting holder.
Figure 9C:
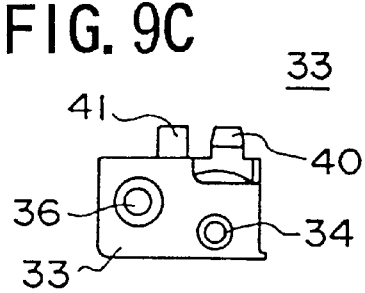
FIG. 9C is a front view of the mounting holder.

A description will now be given, with reference to FIGS. 7 to 9, of the pick-up driving mechanism 29. As mentioned above, the pick-up driving mechanism 29 comprises gears 27 and 28. Each of the gears 27 and 28 is rotatably mounted on a respective mounting holder 33 made of a plastic. Specifically, the gear 27 is rotatably supported by a shaft 34 which is press fit into the mounting holder 33. The gear 27 is prevented from being disengaged from the shaft 34 by an E-ring. The gear 28 is provided integrally with an end of the lead screw 30. The end of the lead screw 30 is rotatably supported by a shaft receiving hole 36 formed in the mounting holder 33. Additionally, a leaf spring 37 is provided on a reverse surface opposite to a surface to which the shaft 34 of the mounting holder 34 is press fit so that the leaf spring 37 presses the end of the lead screw 30 protruding from the shaft receiving hole 36. Thus, the lead screw 30 is urged in the direction D.

A bearing 38 is formed on the base 22 which bearing rotatably supports the other end of the lead screw 30. Thus, since the lead screw 30 is supported while being pressed against the bearing 30, the lead screw 30 has high positional accuracy. Thus, the pick-up 5 can be displaced with high accuracy.

Engaging claws 39 and 40 and a boss 41 are formed on the mounting holder 33 corresponding to three mounting holes 22b (only one shown in FIG. 7) formed in the base 22. The mounting holder 33 is securely mounted on the base 22 by the claws 39 and 40 and the boss 41 being engaged with the respective mounting holes 22b.

In the pick-up driving mechanism 29 having the above-mentioned structure, the mounting holder 33 is a separate part from the base 22. As motioned above, the base is formed of a glass fiber mixed plastic so as to have a coefficient of thermal expansion which is approximately that of the pick-up 5 and the turn table 6. On the other hand, since the mounting holder 33 is a separate part from the base 22, there is no need to form the mounting holder 33 by the same material as the material of the base 22. Accordingly, in the present embodiment, the mounting holder 33 is made of a plastic which is not mixed with glass fibers.

The glass fiber mixed plastic has low coefficient of thermal expansion, however, the hardness is high, that is, brittle. Accordingly, in a construction in which a holder supporting the shaft 34 is formed on the base 22, the holder may be cracked when the shaft 34 is press fit into the holder.

In the present embodiment, since the mounting holder 33 to which the shaft 34 is press fit is a separate part from the base 22, the mounting holder 33 can be made of a material different from the material of the base 22. Thus, in the present embodiment, the mounting holder 33 is made of a plastic with no glass fibers mixed therein. Since the plastic mixed with no glass fibers has greater flexibility than the plastic mixed with glass fibers, the mounting holder 33 does not crack when the shaft 34 is press fit.

Accordingly, the press fitting operation of the shaft 34 can be easily made and the yield rate of the assembly is increased by the mounting holder 33 and the base 22 having different characteristics to each other. Additionally, each of the gears 27, 28 and the lead screw 30 can be easily mounted on the mounting holder 33 as compared to a structure in which the pick-up driving mechanism is integral with the base, and thus the assembling operation can be improved.

A description will now be given of the turn table 6. The turntable 6 is directly mounted to a drive shaft of a disk motor 20 provided under the turntable 6. The disk motor 20 rotates the disk clamped on the turn table 6 when the tray 2 reaches the disk loading position inside the apparatus 1.

Figure 6:
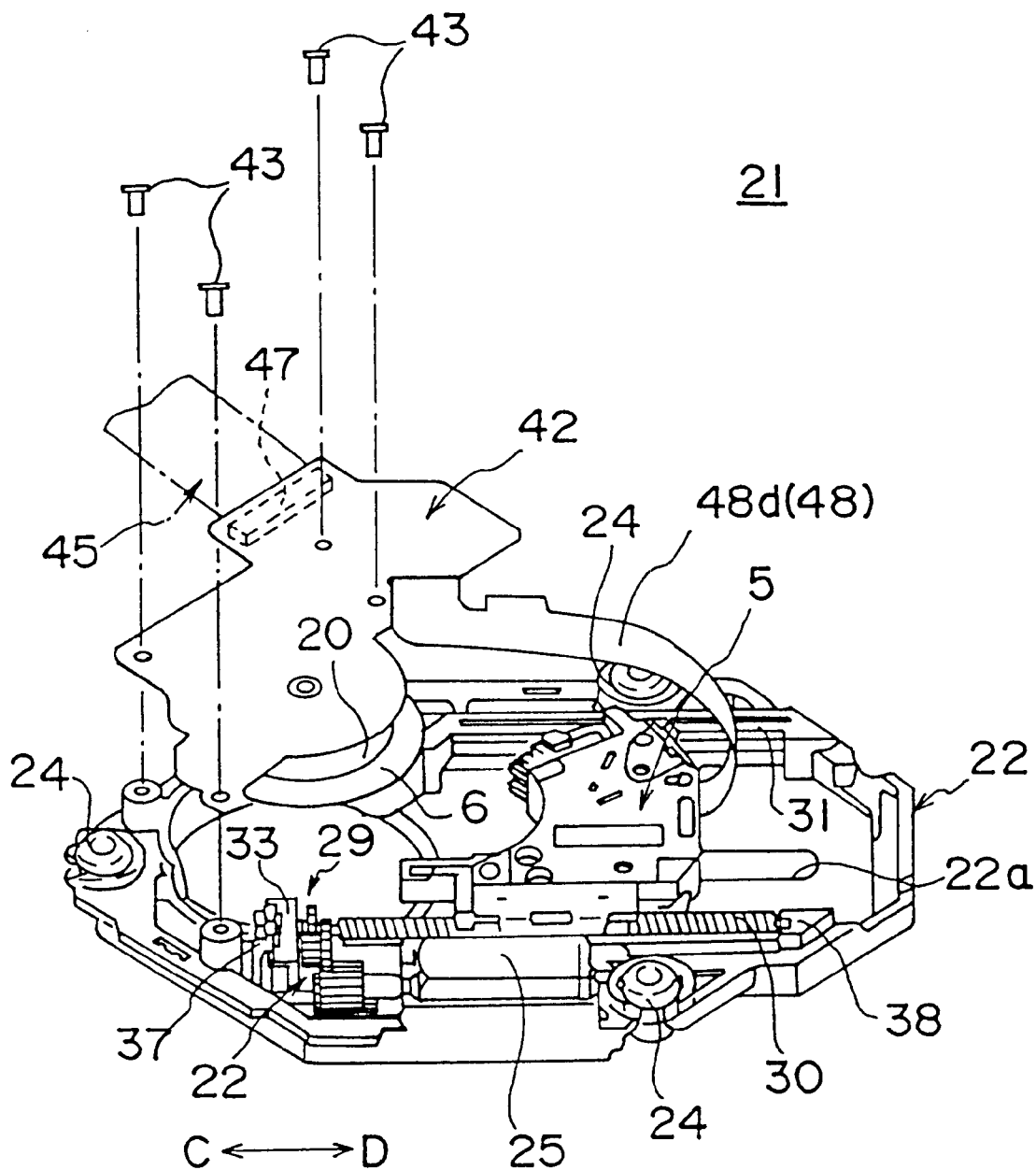
FIG. 6 is a perspective view of the driving unit.

The disk motor 20 is fixed to a motor base member 42 as shown in FIGS. 3, 5 and 6. The disk motor 20 and the turntable 6 integral with the disk motor 20 are mounted to the base 22 by fixing the motor base member 42 to the base 22 by screws 43 as shown in FIG. 6.

A description will now be given of the driving unit 21 with consideration of the electrical connection. As mentioned above, the driving unit 21 is provided with electrical parts such as the pick-up 5, the disk motor 20 and the pick-up driving motor 25 which are to be connected to a circuit board 44 provided in the chassis 10. The circuit board 44 is provided with a signal processing circuit for processing a reproduction signal generated by the pick-up 5 and a control circuit for controlling the motors 10 and 25.

Additionally, since the driving unit 21 is moved in the directions A and B, a flexible board 45 is used for the connection between the driving unit 21 and the circuit board 44. One end of the flexible board 45 on the circuit board side is connected to a connector 46 provided on the circuit board 44. In the present embodiment, as shown in FIGS. 4 and 5, the other end of the flexible board 45 on the driving unit side is connected to a connector 47 (terminal unit) provided on the motor base member 42.

In the prior art, the end of the flexible board 45 on the driving unit side was connected to a connector mounted on a printed circuit board provided on the bottom surface of the driving unit. Additionally, the connection between each of electrical parts and the connector was made by wiring patterns formed on the printed circuit board.

On the other hand, in the present embodiment, the connector 47, which is connected to the flexible board 45, is provided on the motor base member 42. Conventionally, the motor base member 42 is provided for fixing a disk motor thereon, thus the present embodiment uses the motor base member 42 as a member for mounting the connector 47.

According to the above-mentioned construction, the motor base member 42 has a functions the same as that of the conventional printed circuit board, and thus the printed circuit board used in the prior art is eliminated. Thus, the driving unit 21 is reduced in thickness, and consequently the apparatus 1 is reduced in thickness. Additionally, since the printed circuit board used in the prior art is no longer necessary, the number of parts is reduced and the manufacturing cost is also reduced.

In the present embodiment, since the printed circuit board is not provided as mentioned above, it should be a problem as to how to connect the connector 47 to each of the electrical parts 5, 20 and 25. In order to solve this problem, in the present embodiment, a flexible board 48 (hereinafter referred to as an FPC 48) is used for the connection between the connector 47 and each of the electrical parts 5, 20 and 25.

The FPC 48 comprises, as shown in FIG. 5, a base 48a fixed by screws 50 on the front side of the chassis 10; a first extending portion 48b extending from the base 48a toward a solenoid 49 which constitutes a locking mechanism 8 described later; a second extending portion 48c extending from the base 48a toward the pick-up driving motor 25; a third extending portion 48d extending toward the pick-up 5; and a fourth extending portion 48e connecting the base 48a to the connector 47. An electrical connection between the disk motor 20 and the connector 47 is achieved by printed wirings.

It should be noted that, in the present embodiment, although the FPC 48 is used for the connection between the connector 47 and each of the electrical parts 5, 20 and 25, a lead wire or a jumper wire may instead be used.

Figure 10:
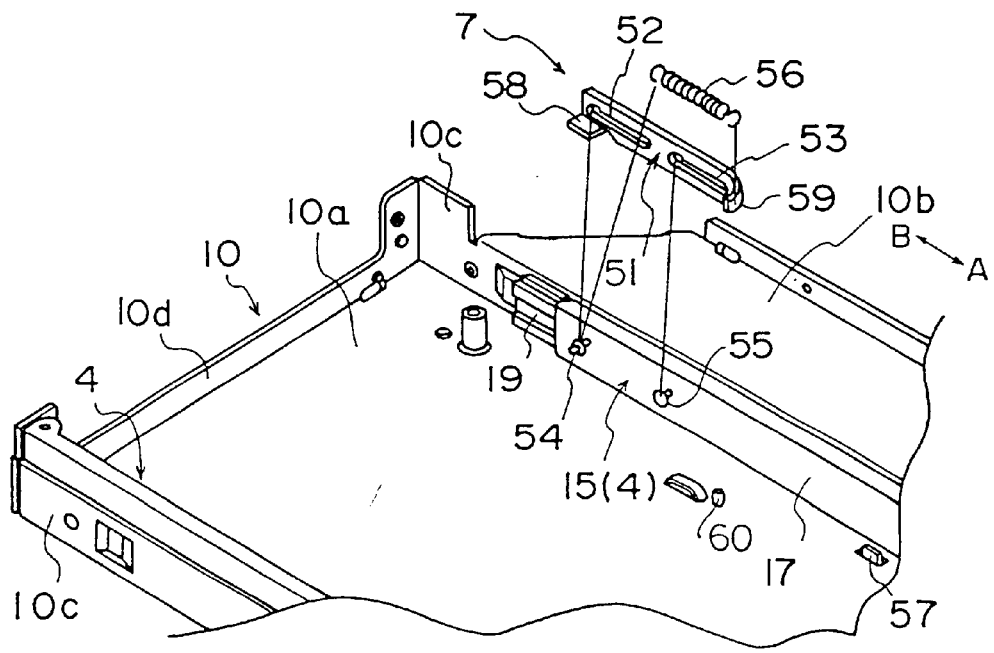
FIG. 10 is a perspective view for explaining a tray sliding mechanism and an engaging mechanism.

A description will now be given, with reference to FIGS. 10 and 11, of the engaging mechanism 7. As previously mentioned, the engaging mechanism 7 is provided for restricting the movement of the tray 2 beyond the disk loading position when the tray 2 reaches the disk loading position. The engaging mechanism 7 comprises an engaging lever 51 provided on an end of the movable side rail 17 provided on the tray 2 on the arrow B side; a pair of engaging pins 54 and 55 which are raised from the movable side rail 17 and engage with corresponding elongated holes 52 and 53; a coil spring 56 urging the engaging lever 51 in the direction B; and an engaging protrusion 57 provided on the chassis 10 in the vicinity of the end of the arrow A side.

The engaging lever 51 is movable relative to the movable side rail 17 in the directions A and B over the length of the elongated holes 52 and 53 by the elongated holes 52 and 53 engaging with the respective engaging pins 54 and 55. That is, the engaging lever 51 moves, in the direction A, to a first position in which the engaging lever 51 protrudes from the rear end of the tray 2 (by a distance indicated by L in FIG. 11A); the engaging lever 51 moves, in the direction B, to a second position in which the engaging lever 51 is positioned inside the tray 2.

The engaging claw 58 is formed under an end of the engaging lever 51 on the arrow B side to engage with the engaging protrusion 57 formed on the chassis 10; and a connection strip 59 is formed on the other end on the arrow A side and is connected to an end of a coil spring 56. The other end of the coil spring 56 is connected to the engaging pin 54.

A description will now be given, with reference to FIGS. 11A, 11B and 11C, of an operation of the engaging mechanism 7. FIG. 11A shows a state where the tray 2 is drawn or moved to the disk replacing position. In this state, the movement of the tray 2 in the direction A is restricted since the engaging claw 58 of the engaging lever 51 engages with the engaging protrusion 57 formed on the chassis 10. In the state where the tray 2 is drawn to the disk replacing position, the engaging lever 51 is moved in the direction B. Thus, the engaging lever 51 protrudes from the rear end (corresponds to the rear end of the tray 2) of the movable side rail 17.

By providing the engaging lever 51, the tray 2 can be drawn further in the direction A corresponding to the moving range of the engaging lever 51 relative to the movable side rail 17. That is, if the engaging lever 17 is not provided, the engaging claw 58, which engages with the engaging protrusion 57 formed on the chassis 10, must be provided in the rear end of the movable side rail 17.

However, in the construction in which the engaging claw 58 is provided on the rear end of the movable side rail 17, the draw length of the tray 2 is reduced by the distance L, and thus a replacing operation of the disk may be inconvenient (for example, the disk must be moved in an oblique direction).

On the other hand, in the present embodiment, since the engaging lever 51 is provided to allow a large drawable length of the tray 2 in the direction A, the replacing operation of the disk with respect to the tray 2 can be easily performed.

FIG. 11B shows a state where the tray 2 is pressed in the direction B and the end of the engaging lever 51 on the arrow B side is in contact with the rear end 10d of the chassis 10. In this state, if the tray 2 is pressed further in the direction B, the engaging lever 51 moves relative to the movable side rail 17 in the direction A against the spring force of the coil spring 56, resulting in the state shown in FIG. 11C. The state shown in FIG. 11C is the state where the tray 2 is positioned in the disk loading position and the tray 2 is locked in the disk loading position by the locking mechanism described later.

When the locking mechanism 8 of the tray 2 is unlocked by the switch button being pressed, resulting in the tray 2 being in a movable state 2, the engaging lever 51 is moved relative to the movable side rail 17 in the direction B by the pressing force generated by the coil spring 56. By this movement of the tray 2, the tray 2 moves to an eject position, which is shown in FIG. 11B, in which the tray 2 slightly protrudes from the front end of the chassis 10. Thus, an operator of the apparatus 1 can draw or move the tray 2 by holding the protruding portion of the tray 2.

As apparent from the above description, the engaging mechanism 7 has the function to eject the tray 2 as well as the function to restrict the movement in the direction A when the tray 2 reached the disk loading position. Thus, there is no need to provided separately an eject mechanism. This results in a reduction of the number of parts and miniaturization of the apparatus 1.

A description will now be given of the locking mechanism 8. The locking mechanism 8 is provided in the locking mechanism receiving portion 3b of the frame member 3a of the sub-chassis 3 as shown in FIGS. 5 and 12 to 15. The locking mechanism 8 comprises a solenoid 49, a lock pin 60, a lock lever 61 and an emergency lever 62.

The lock pin 60 extends from the bottom of the chassis 10. The lock lever 61 is rotatably supported by a shaft 63 protruding from the reverse surface of the frame member 3a of the sub-chassis 3. The lock lever 61 comprises an arm 65 having, on an end thereof, a claw 64 engaging with the lock pin 60; and a connecting arm 67 connected to a plunger 66 of the solenoid 49. Additionally, a tapered portion 68 is formed on an end of the claw 64, and a pin 69 engaging with the emergency lever 62 is formed on the arm 65.

The solenoid 49 is exited and attracts the plunger 66 when the switch button 12 on the front bezel 11 is turned on. Since the end of the plunger 66 is connected to the connecting arm 67 of the lock lever 61, the lock lever 66 rotates about the shaft 63 in cooperation with the operation of the plunger 66. It should be noted that the plunger 66 is urged in the protruding direction by a coil spring 70a provided in the solenoid 49.

Figure 14:
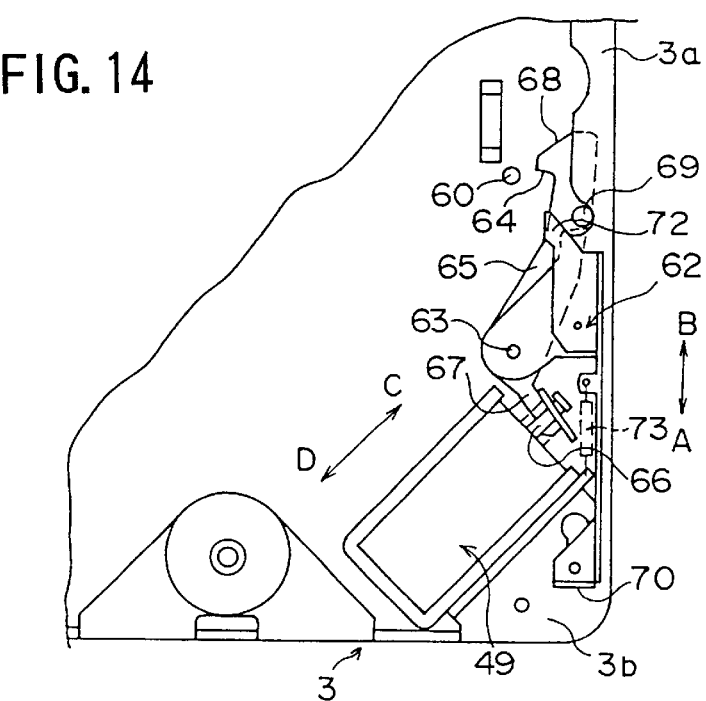
FIG. 14 is a plan view for explaining an operation of the locking mechanism.

A description will now be given of an operation of the locking mechanism 8. As described above with reference to FIGS. 11A, 11B and 11C, when the tray 2 is pressed in the direction A and moves toward the disk loading position, the sub-chassis 3 also moves in the direction A and the lock lever 61 approaches the lock pin 60. In a state where the tray 2 reached the disk loading position, the tapered portion 68 of the lock pin 60 has passed over the lock pin 60 and the claw 64 engages with the lock pin 61. Accordingly, the sub-chassis 3 is locked by the locking mechanism 8, and thus the tray 2 provided in the sub-chassis 3 is locked. FIG. 14 shows the locking state.

On the other hand, when the switch button 12 is operated to turn on the switch so as to attract the plunger 66, the lock lever 61 rotates in the direction in which the lock lever 61 moves away from the lock pin 60 so that the engagement between the claw 64 and the lock pin 60 is released. Thereby, the lock of the sub-chassis 3 by the locking mechanism 8 is released, and the state (unlocked state) where the sub-chassis 3 is movable as shown in FIG. 15 is achieved.

Additionally, the emergency lever 62 is provided on the frame member 3a of the sub-chassis 3 to be movable in the directions A and B. A contact portion 70 is formed on one end of the emergency lever 62 on the arrow B side so that the contacting portion 70 is opposite to a needle insertion hole 71 (shown in FIG. 16). Additionally, an operational claw 72 having a tapered shape is formed on the other end of the emergency lever 62 on the arrow B side so that the operational claw 72 is opposite to the pin 69 provided on the lock lever 61. Further, the emergency lever 62 is urged in the direction A by a coil spring 73.

The emergency lever 62 having the above-mentioned construction is designed so that the tray 2 can be drawn or moved by unlocking the locking mechanism 8 even when the power of the computer incorporating the apparatus 1 is turned off, that is, when actuation of the solenoid 49 is enabled.

Figure 15:
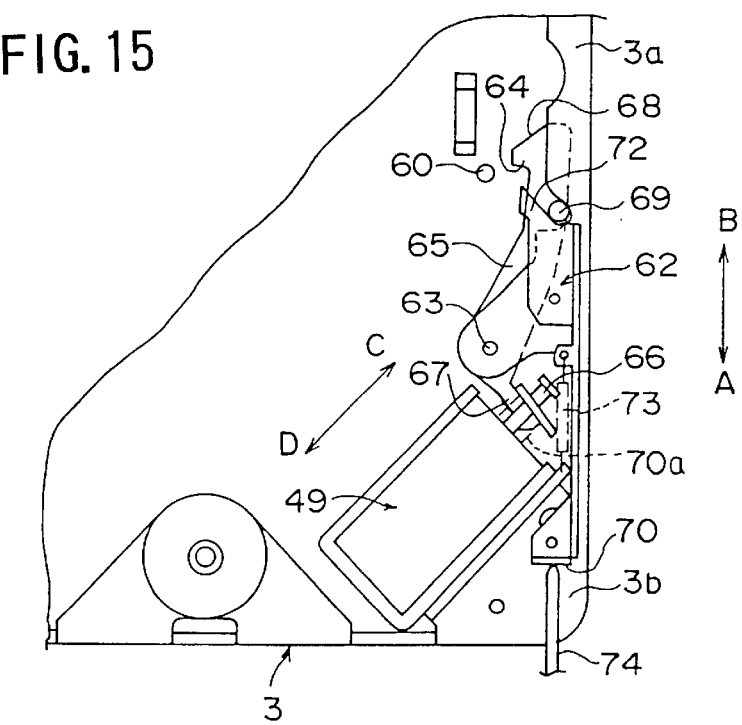
FIG. 15 is a plan view for explaining an operation of an emergency lever.

More specifically, when the actuation of the solenoid 49 is enabled, a needle 74 is inserted into the needle insertion hole 71 in the direction B as shown in FIG. 15. Thereby, the needle 74 presses the emergency lever 62 in the direction B. When the needle 74 rotates in the direction B due to the pressing force applied by the needle 74, the operational claw 72 engages with the pin 60 provided on the lock lever 61 so as to press it. As mentioned above, since the operational claw 72 has a tapered shape, the lock lever 61 is rotated as the operational claw 72 is moved in the direction B, and the engagement between the claw 64 and the lock pin 60 is finally released. Thereby, when the solenoid 49 is in a state where actuation thereof is enabled, the tray 2 can be drawn from the chassis 10.

A description will now be given of an arrangement of the solenoid 49. In the present embodiment, the solenoid 49 is arranged so that the moving directions of the plunger 66 indicated by the arrows C and D is angled to the directions A and B which are the moving directions of the tray 2. Specifically, in the present embodiment, the moving directions of the plunger 66 are angled 45 degrees with respect to the moving directions of the tray 2.

As mentioned above, the locking mechanism 8 is unlocked by the plunger 66 moving in the direction D. Since the apparatus 1 provided with the locking mechanism 8 is incorporated into a personal computer or the like, the locking mechanism may be subjected to shocks. If a direction of the shock corresponds to the moving direction of the plunger 66, the plunger 66 may be moved. This may result in unlocking of the tray 2 by the locking mechanism 8, and the tray 2 may be ejected from the chassis 10.

According to an investigation performed on directions of a shock applied to the apparatus 1 in a state where the apparatus 1 is incorporated into a personal computer, it was found that in most cases the shocks are applied to the apparatus 1 in the directions A and B or the directions C and D. Accordingly, if the moving direction of the plunger 66 is angled with respect to the moving directions of the tray 2 (the directions A and B) as is in the present embodiment, the moving directions of the plunger 66 is differed from the directions in which most shocks are applied. Accordingly, in the present embodiment, the tray 2 is positively locked against shocks applied to the apparatus 1.

Additionally, by inclining the moving directions of the plunger 66 with respect to the moving directions of the tray 2, the solenoid 49 can be arranged substantially parallel to the pick-up driving motor 25. Thereby, the solenoid 49 can be placed adjacent to the pick-up driving motor 25. Thus, the apparatus 1 can be miniaturized as compared to the conventional apparatus in which a pick-up driving motor is placed at an opposite end of a diagonal line of the sub-chassis 3 with the pick-up 5 interposed therebetween.

Figure 16:
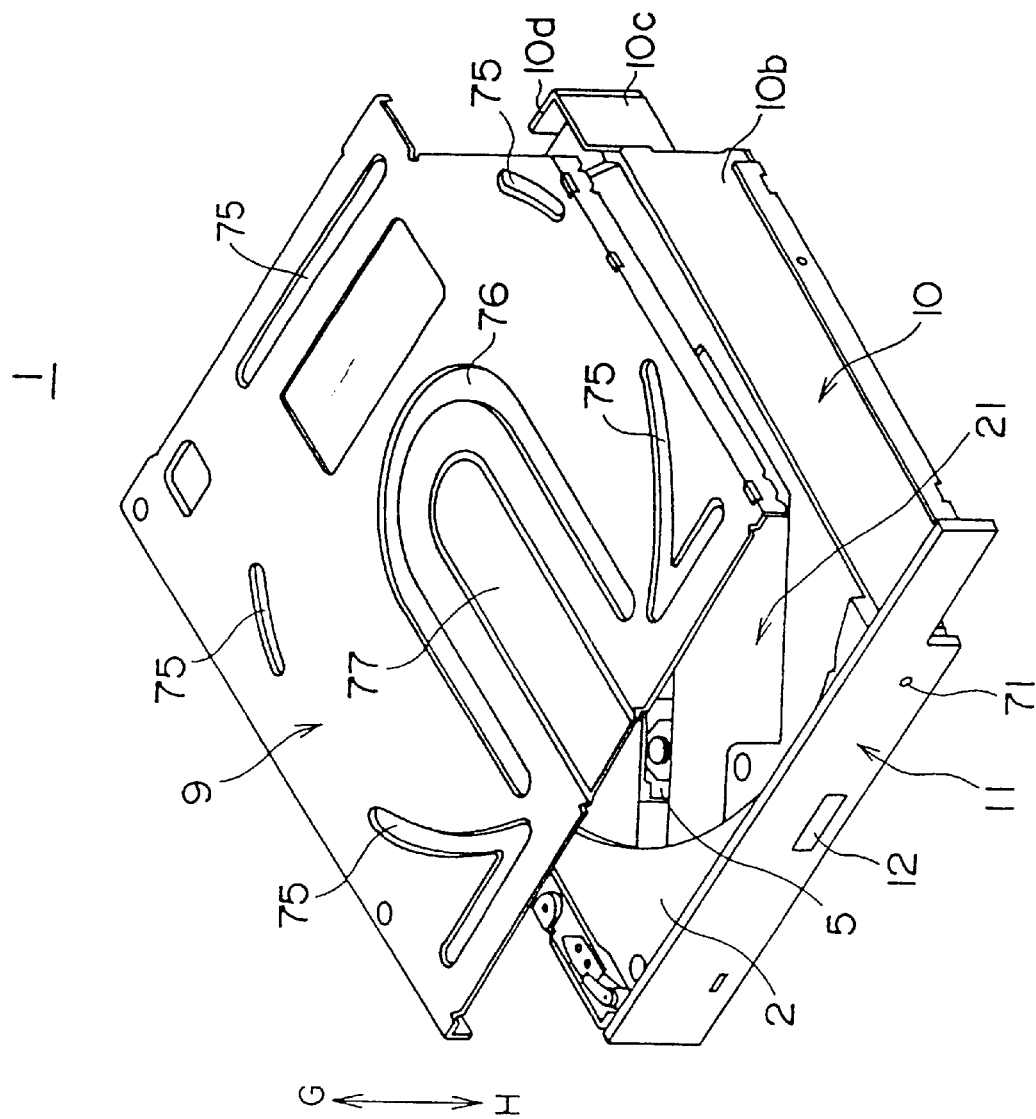
FIG. 16 is a perspective view for explaining a protrusions formed on a cover.

A description will now be given, with reference to FIGS. 16, 17A and 17B, of a cover 9.

The cover 9 is provided over the chassis 10 to protect each part provided on the chassis 10. The cover 10 is formed of a steel plate by press forming, a thickness of the steel plate being thin so as to reduce the thickness of the apparatus 1. Elongated protrusions 75, 76 and 77, which function as beads for providing a predetermined strength to the cover 9, are formed in the cover 9 so as to provide a predetermined strength to the cover 9, the protrusions 75 and 76 protruding downwardly and the protrusion 77 protruding upwardly. The protrusions 75, 76 and 77 are formed at the same time the cover 9 is press formed, and thus the protrusions 75, 76 and 77 are easily formed. In this embodiment, for example, a height of the protrusions 75 is about 0.6 mm, a height of the protrusion 76 is about 0.4 mm, and a height of the protrusion 77 is about 0.15 mm.

Figure 17A:
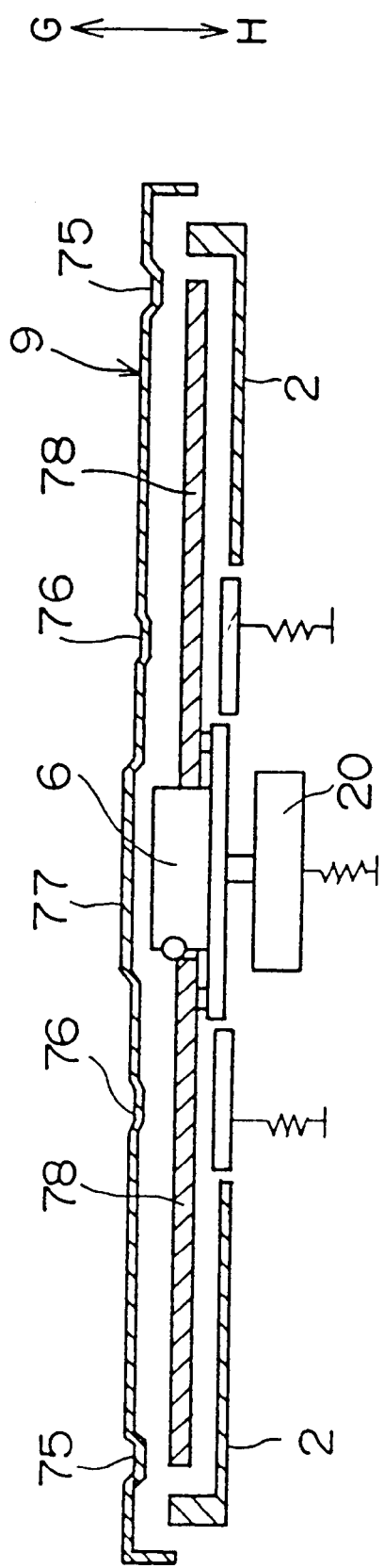
FIG. 17A is an illustrative cross-sectional view of the disk apparatus for explaining the protrusions formed on the cover.

As shown in FIG. 17A, one of the features of the present embodiment is that the protrusions 75 among the protrusions provided in the cover 9 are opposite to an outer portion of the disk 78 loaded in the apparatus 1.

Figure 17B:
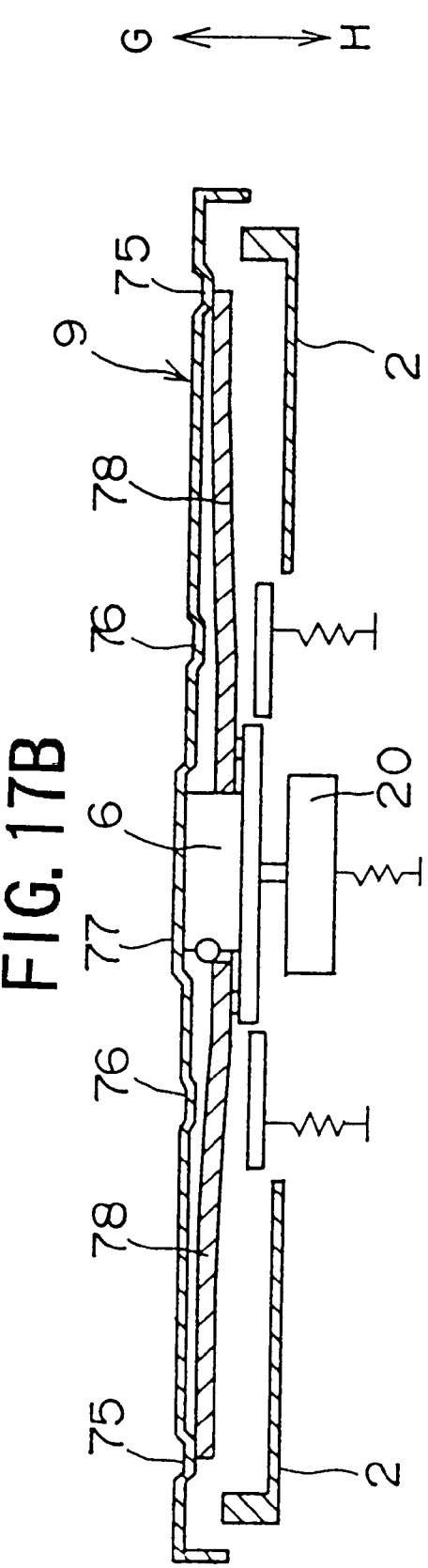
FIG. 17B is an illustrative cross-sectional view of disk apparatus for explaining an action of the protrusions formed on the cover.

According to the above-mentioned feature, the disk 78 contacts only the protrusions 75 when the disk 78 warps as shown in FIG. 17B due to shocks applied in up and down directions (directions indicated by arrows G and H in the figures). A width of a contacting portion of each of the protrusions 75 measured in a radial direction of the disk 78 is about 1 mm.

Generally, the disk 78 which is used with a CD-ROM drive has a recording surface and a printed surface on which various print information is provided opposite to the recording surface. Accordingly, when shocks are applied to the apparatus 1 in the up and down directions and if the contact area between the disk 78 and the cover 9 is wide, the print on the printed surface may be scratched off the surface of the disk 78. This condition causes a problem in that the disk 78 cannot be identified.

However, in the present embodiment, the outermost annular contacting area between the disk 78 and the cover 9 is limited to areas where the protrusions 75 are formed. The contacting area is narrow and adjacent to the outer rim of the disk 78, that is, the contact area is provided in an area corresponding to the area of the disk 78 in which generally no print information is provided. Accordingly, if the disk 78 contacts and slides on the protrusions 75, the print provided on the disk 78 is prevented from being scratched off the disk 78, and thus the disk 78 can be positively identified.

Additionally, the disk 78 has the recording surface which reflects a laser beam, and a plastic layer is provided to each side of the disk 78 to protect the disk 78 from being damaged. Since the plastic layer on a printed surface side where the print is provided has normally a thickness of only 30 $\mu$m, the plastic layer on the printed surface side is shaved to the extent that the reflecting surface of the disk 78 is damaged. This results in destruction of data recorded on the disk 78.

However, in the present embodiment, the outermost annular contacting area between the disk 78 and the cover 9 has a width of about 1 mm, while an area adjacent to the rim of the disk 78 (CD-ROM) has a non-recordable area having a width of about 2 mm in which no information is recorded. Thus, even if the plastic layer on the printed side is completely shaved off, no influence is provided to the data recorded on the disk 78, resulting in a positive reproduction of the data recorded on the disk 78.

Additionally, in the present embodiment, since the beads for reinforcing the cover which is made of a thin metal plate are used as the contacting member, a separate part is not needed as the contacting member.

Figure 18A:
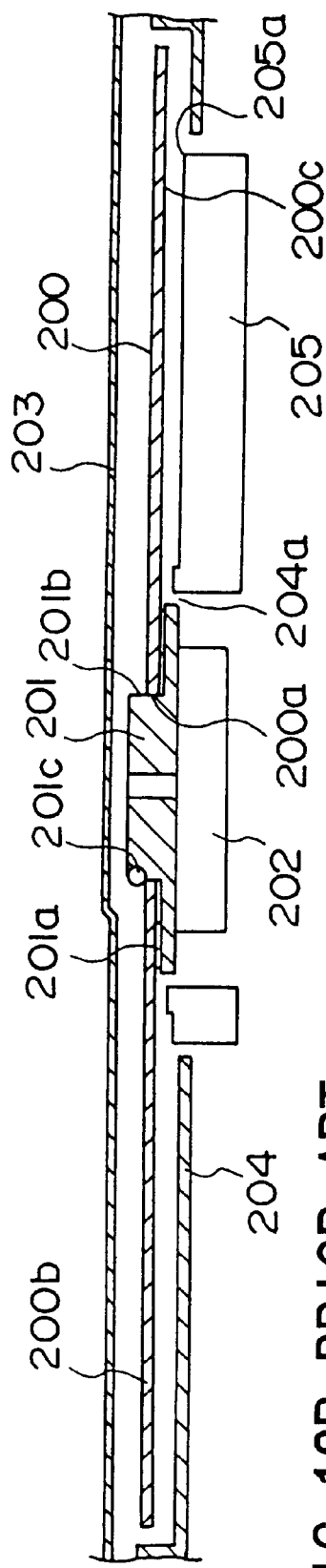
FIGS. 18A and 18B are illustrations for explaining a problem which may occur in a conventional disk apparatus.
Figure 18B:
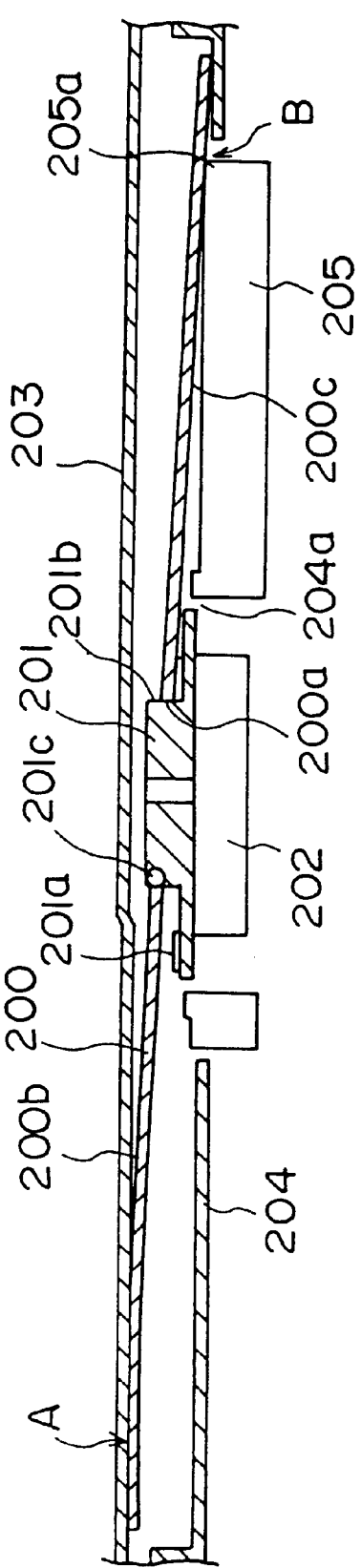

A description will now be given of a second embodiment according to the present invention. FIGS. 18A and 18B are illustrations for explaining a problem which may occur in a conventional disk apparatus.

As shown in FIG. 18A, normally, a disk 200 is horizontally supported on a supporting surface 201a of a turntable 201 in a horizontal position. The turntable 201 is directly connected to a rotational shaft of a disk motor 202. Thus, the disk 200 placed on the turntable 201 is rotated by a rotational force of the disk motor 202. A cover 203 is provided above the turntable 201 so as to prevent dusts from intruding into an interior of the disk apparatus.

A tray 204 and a base 205 are provided under the turntable 201. Since the base 205 is provided with an optical pickup (not shown in the figures) and a drive motor and a lead screw for driving the optical pickup, a top surface of the base 205 slightly protrudes from an opening 204a of a tray 204.

Engaging balls 201c (only one shown in the figures) are provided on an outer surface of a fitting portion 201b of the turntable 201. The engaging balls 201c are positioned at 120 degree interval. Each of the engaging balls 201c is urged in a radial direction of the turntable 201 by a spring accommodated inside the turntable 201. Accordingly, when the disk 200 is placed on the turn table 201, the engaging balls 201c are pressed by a center opening 200a of the disk 200, and move toward inside the fitting portion 201b. When the disc 200 contacts the supporting surface 201a, the engaging balls 201c protrudes from the fitting portion 201b so as to hold the disk 200.

A disk apparatus, which is incorporated into a notebook type personal computer, receives a shock more frequently than that incorporated in a desk-top type personal computer. As shown in FIG. 18A, when no shock is applied to the disk apparatus, the disk 200 completely contacts the supporting surface 201a by being held by the engaging balls 201c, and is maintained in a horizontal position.

However, if a shock is applied in the vertical direction (a direction of the rotational axis of the disk motor 202), the disk 200 is subjected to an acceleration and the disk 200 may be slanted with respect to the supporting surface 201a of the turntable 200 as shown in FIG. 18B. In this case, a top surface 200b of the disk 200 may contact the cover 203 and a bottom surface 200c of the disk 200 may contact a corner 205a of the base 205. Accordingly, a print on the top surface 200b of the disk may be scratched off as explained before.

The bottom surface 200c of the disk 200 is provided with a recording surface which reflects a laser beam projected from the optical pickup. The recording surface is covered with a transparent plastic layer. Accordingly, if the bottom surface 200c of the disk 200 contacts the corner 205a of the base 205, the plastic layer is scratched off. This causes an inaccurate reading operation of information recorded on the recording surface.

In order to eliminate the above-mentioned problems, the second embodiment of the present invention features protruding portions provided on the tray 2 so as to restrict inclination of a disk. It should be noted that a basic construction of the disk apparatus according to the second embodiment is the same as that of the above-mentioned first embodiment of the present invention, and a description of the second embodiment is given by referring to the structure of the disk apparatus according to the first embodiment.

Figure 19:
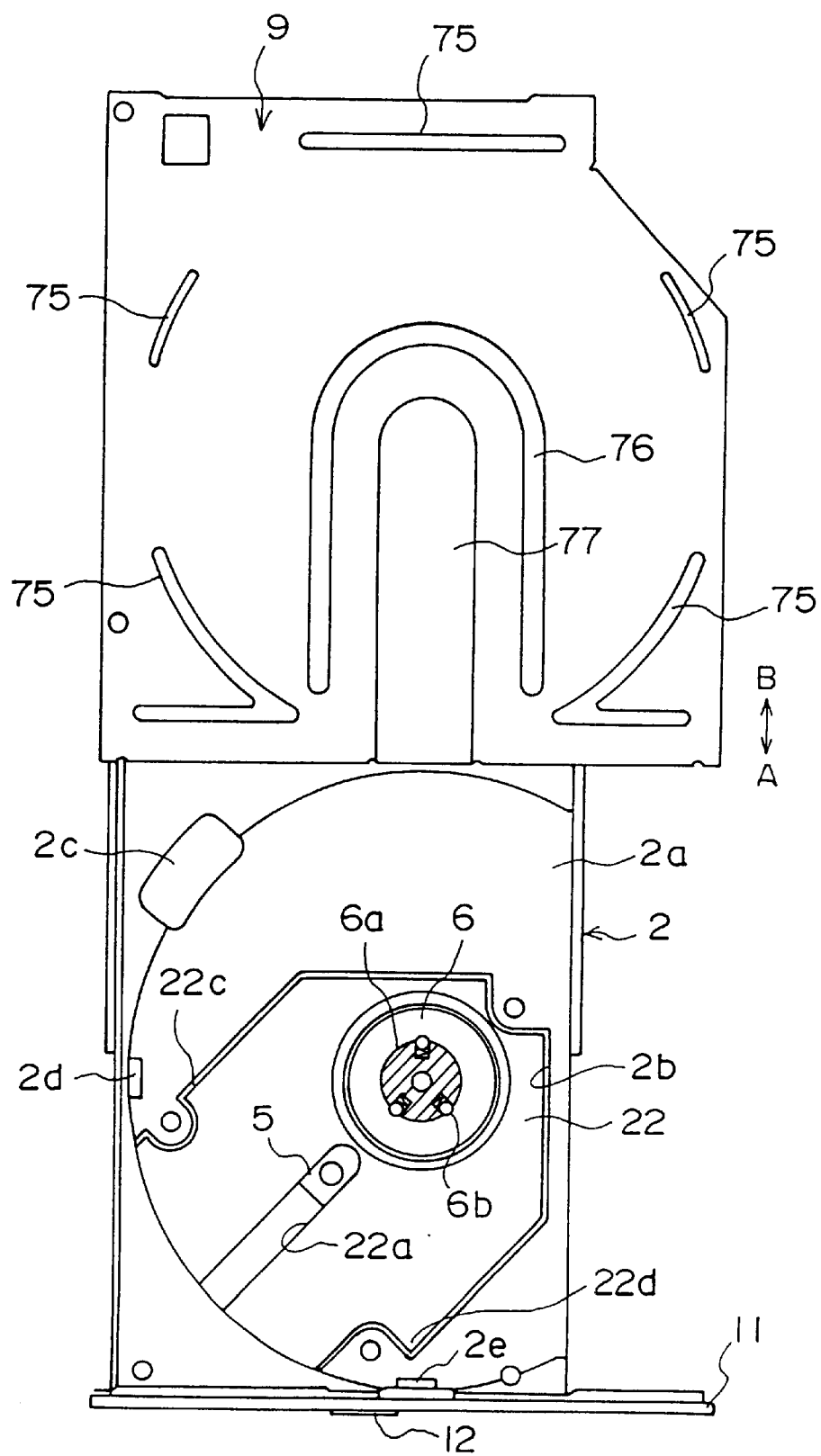
FIG. 19 is a plan view of a tray and a cover provided in a disk apparatus according to a second embodiment of the present invention.

FIG. 19 is a plan view of the tray and the cover provided in the disk apparatus according to the second embodiment of the present invention. As shown in FIG. 19, the tray 2 is provided with protruding portions 2d and 2e which restrict inclination of the disk. The protruding portions 2d and 2e are formed on a disk facing surface 2a which faces the disk when the disk is placed on the turntable 6. The protruding portion 2d is provided in a position in which the disk is prevented from making contact with a corner 22c of the base 22. The protruding portion 2e is provided in a position in which the disk is prevented from making contact with a corner 22d of the base 22.

Figure 20:
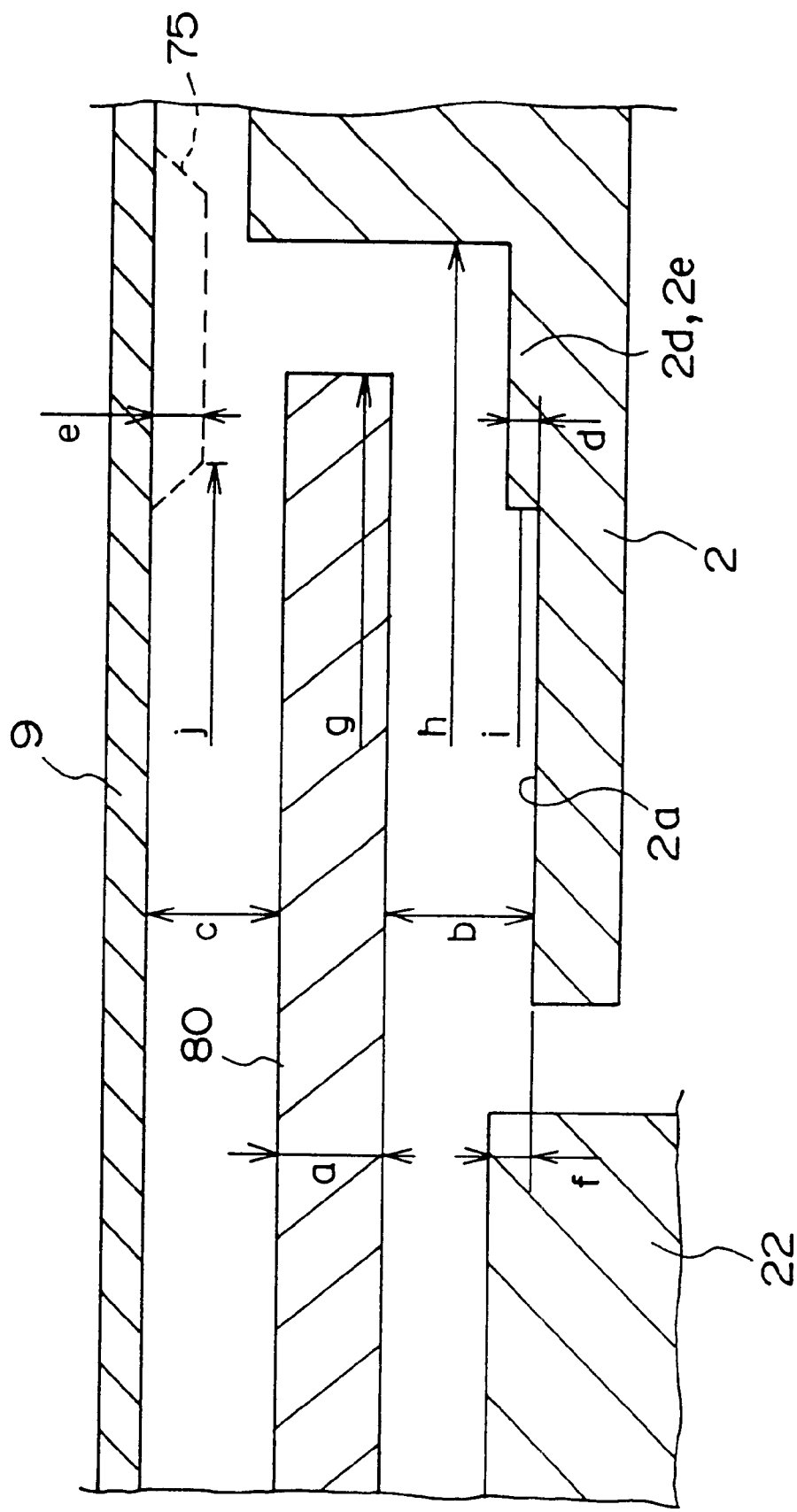
FIG. 20 is an enlarged cross-sectional view of a part of the disk apparatus according to the second embodiment of the present invention.

FIG. 20 is an enlarged cross-sectional view of a part of the disk apparatus for indicating a positional relationship between the disk and each of the protrusion 75 and the protruding portions 2d and 2e. Since the protrusion 75 is not actually located in the plane shown in FIG. 20, the protrusion is indicated by dotted lines.

In the present embodiment, a thickness (a) of the disk 80 is 1.2 mm; a distance (b) between the disk 80 and the disk facing surface 2a is 1.7 mm; a distance (c) between the disk 80 and the cover 9 is 1.6 mm; a height (d) of the protruding portions 2d and 2e is 0.4 mm; a height (e) of the protrusion 75 is *0.6* mm; a protruding distance (f) of the base 22 from the level of the disk facing surface 2a is 0.55 mm; a radius (g) of the disk 80 is 60 mm; a radius (h) of the disk facing surface 2a is 61.5 mm; a distance (i) from the center of the turntable to an inner end of each of the protruding portions 2d and 2e is 58.5 mm; and a distance (j) from the center of the turntable to an inner end of the protrusion 75 is 59 mm.

Although, the heights of the protrusion 75 and the protruding portions 2d and 2e are small, each of the protrusion 75 and the protruding portions 2d and 2e is located in a position opposite to an outermost are of the disk 80. Thus, when the disk 80 is slanted with respect to the turntable 6, the outermost area of the disk 80 first contacts the protrusion 75 and the protruding portions 2d and 2e.

Figure 21:
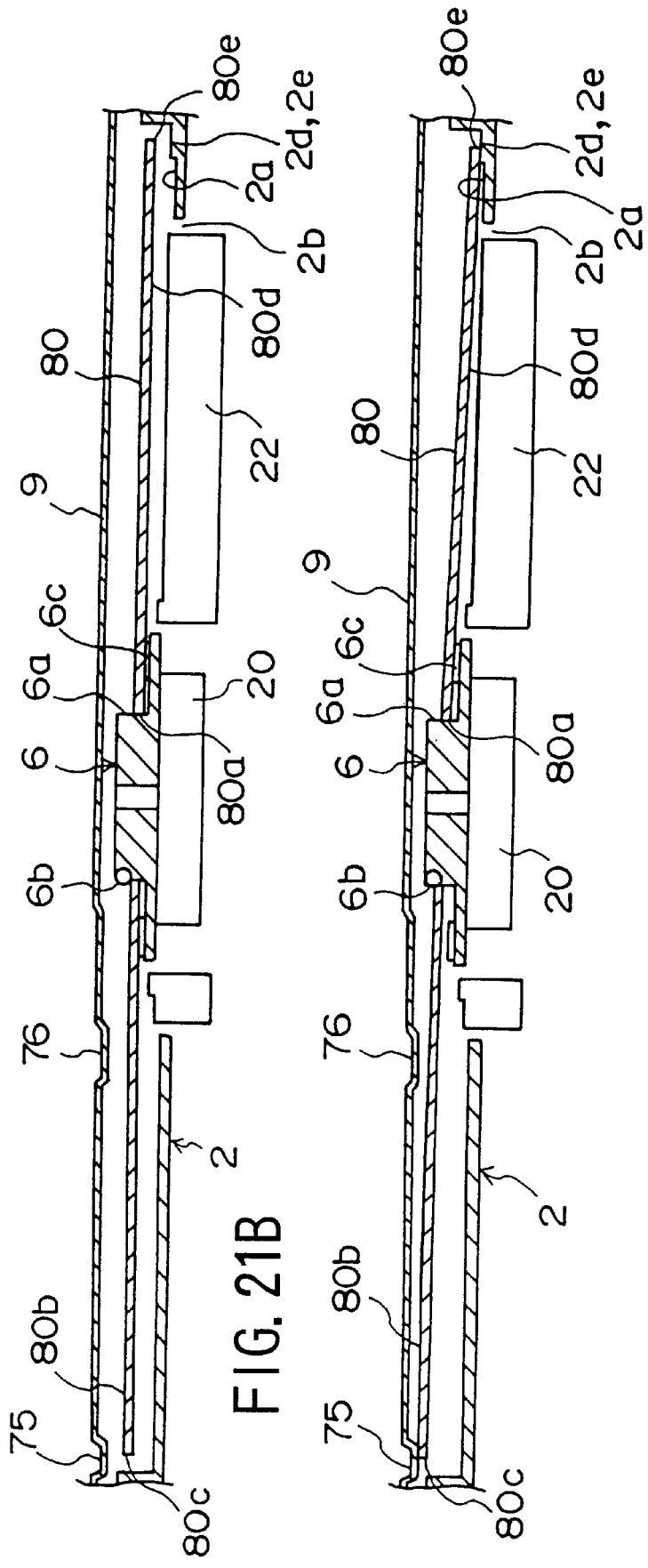
FIGS. 21A and 21B are cross-sectional views of a part of the disk apparatus according to the second embodiment of the present invention.

FIGS. 21A and 21B are cross-sectional views of a part of the disk apparatus according to the second embodiment of the present invention when the disk 80 is mounted on the turntable 6.

As shown in FIG. 21A, the disk 80 is held on the supporting surface 6c of the turntable 6 in the horizontal position by the center opening being engaged with the engaging balls 6b.

However, when a shock is applied in the direction of the rotational axis of the disk motor 20 in a state where the disk 80 is placed on the turntable 6, it is possible that the disk 80 is slanted as shown in FIG. 21B. In such a case, the outermost area 80c of the top surface 80b of the disk 80 contacts the protrusion 75, and the outermost area 80e of the bottom surface 80d of the disk 80 contacts the protruding portions 2d and 2e of the disk facing surface 2a.

Generally, a print is provided on the top surface 80b of the disk 80 which print indicates contents of the disk 80. Thus, if the disc 80 contacts the cover 9 due to a shock while the disk 80 is being rotated, the print may be scratched off. This causes a situation in which the contents of the disk 80 cannot be recognized.

However, since the outermost area 80c first contacts the protrusion 75 and other portions of the top surface 80b of the disk 80 do not contact the cover 9, the print on the top surface 80b is prevented from being scratched off. In this embodiment, a width of the protrusion 75 which is measured in a radial direction of the turntable 6 is set to about 1 mm. Additionally, the height of the protrusion 75 is set to an appropriate value so that the top surface 80b of the disk 80 does not contact the cover 9 even when the disk 80 is warped after the disk 80 contacts the protrusion 75. The protrusion 75 of the present embodiment has the same effect as the effect of the protrusion of the first embodiment.

Additionally, the bottom surface 80d of the disk 80 serves as a recording surface. More specifically, the recording surface is actually provided inside the disk 80 and is covered with a transparent plastic layer. The recording surface reflects a laser beam projected from the optical pickup 5 so that information recorded on the recording surface is read. Accordingly, if the plastic layer covering the recording surface is scratched by the corner 22a of the base 22, the information recorded on the recording surface cannot be read accurately.

However, in the present embodiment, since the outermost area 80e of the bottom surface 80d first contacts the protruding portions 2d and 2e, further inclination of the disk 80 is prevented. Thus, the bottom surface 80d of the disk 80 does not contact the corner 22a of the base 22. This prevents the disk 80 from being damaged due to the bottom surface 80d contacting the corner 22a of the base 22.

It should be noted that, in the present embodiment, each of the protruding portions 2d and 2e is located in a position where the outermost surface having a width of about 1 mm contacts the protruding portions 2d and 2e. Normally, a CD-ROM is provided with a non-recording area having a width of about 2 mm at the outermost area of the disk. Thus, information recorded on the disk 80 is prevented from being damaged even when the disk 80 contacts the protruding portions 2e and 2d.

Figure 22:
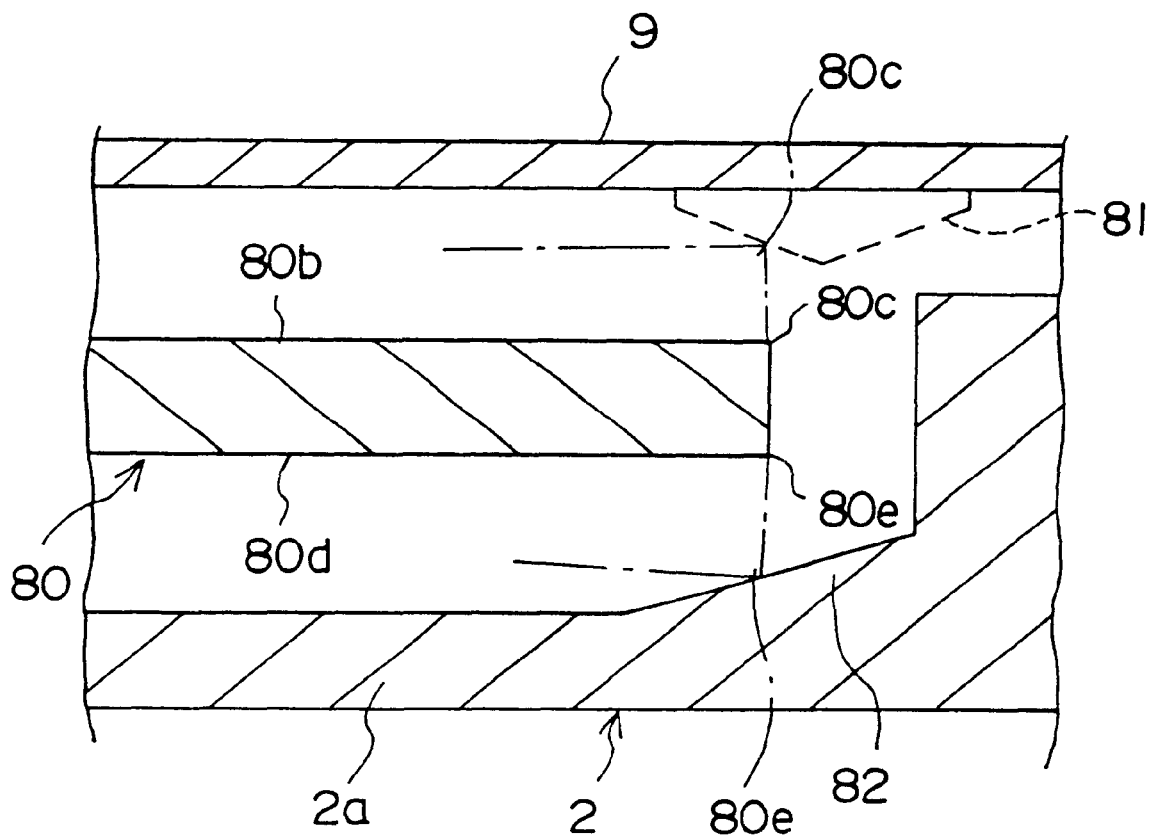
FIG. 22 is a cross-sectional view of a part of a disk apparatus according to a third embodiment of the present invention.

A description will now be given, with reference to FIG. 22, of a third embodiment of the present invention. FIG. 22 is a cross-sectional view of a part of a disk apparatus according to the third embodiment of the present invention. In FIG. 22, parts that are the same as the parts shown in FIGS. 20, 21A and 21B are given the same reference numerals.

In the third embodiment, the protrusion 75 of the first and second embodiment is replaced by a slant portion 81 having a slant surface. The slant surface of the slant portion 81 is located in a position where the outermost area or rim 80c of the disk 80 contacts the slant surface when the disk 80 is inclined. Accordingly, further inclination of the disk 80 is prevented after the rim 80c contacts the slant surface of the slant portion 81. Thus, the top surface 80b of the disk 80 is prevented from making contact with the cover 9.

Additionally in the third embodiment, the protruding portions 2d and 2e of the second embodiment is replaced by a slant portion 82 having a slant surface. The slant surface of the slant portion 82 is located in a position where the outermost area or rim 80e of the disk 80 contacts the slant surface when the disk 80 is inclined. Accordingly, further inclination of the disk 80 is prevented after the rim 80e contacts the slant surface of the slant portion 82. Thus, the bottom surface 80d of the disk 80 is prevented from making contact with the corner 22a of the base 22.

In the third embodiment, since the rims 80c and 80d contacts the respective slant surfaces of the slant portions 81 and 82, a frictional force generated by the contact between the disk 80 and the slant portions 81 and 82 is minimized. Thus, the load applied to the disk motor 20 is reduced.

It should be noted that the present invention is not limited to the above-discussed CD-ROM drive apparatus, and may be applied to other disk-like recording media such as a regular compact disk, a magnetic disk, a magnetooptical disk or an optical disk.

Additionally, the present invention is not limited to the disk apparatus which may be incorporated into a housing of the notebook type personal computer, and may be applied to other apparatuses such as an electronic apparatus and that used as an external apparatus separate from the electronic apparatus.

The present invention is not limited to the specifically disclosed embodiments, and variations and modifications may be made without departing from the scope of the present invention.

What is claimed is:

1. A disk apparatus for rotationally driving a disk-shaped recording medium in a plane of rotation defining a normal position with the recording medium supported on a chassis and having a cover extending over said recording medium, said recording medium having a rim, a recordable portion forming a recordable area and an outermost portion containing an annular non-recordable portion adjacent said recordable portion for defining an annular non-recordable radial area, said disk apparatus comprising:

a space under said cover in which said recording medium is rotatably supported by a tray when said recording medium is loaded in said disk apparatus; and a contacting member separated from the recording medium when the recording medium is rotating in the normal position, said contacting member protruding from said cover into said space so that said contacting member faces said annular non-recordable radial area contiguous to the rim of said recording medium and extends into said space in an arrangement in juxtaposition with the rim of the recording medium to cause contact to occur between said contacting member and the annular non-recordable radial area in the outermost portion of the recording medium when said recording medium is warped such that the plane of rotation of the recording medium has deviated from the normal position thereby permitting reproduction of data recorded on the recorded medium to take place despite warping of the recording medium.

2. The disk apparatus as claimed in claim 1, wherein said contacting member contacts only a predetermined width of said non-recordable portion.

3. The disk apparatus as claimed in claim 2, wherein said space is defined between said tray on which said recording medium is placed and a cover covering said tray, and said contacting member is provided on said cover.

4. The disk apparatus as claimed in claim 3, wherein said contacting member is a part of said cover and said contacting member protrudes toward said tray.

5. The disk apparatus as claimed in claim 4, wherein said cover is made of a metal plate.

6. The disk apparatus as claimed in claim 5, wherein said contacting member is a bead formed on said cover.

7. The disk apparatus as claimed in claim 3, wherein said contacting member faces said recording medium when said recording medium is loaded in said disk apparatus.

8. The disk apparatus as claimed in claim 3, comprising another contacting member extending from said tray into said space facing said recording medium.

9. The disk apparatus as claimed in claim 1, wherein said contacting member is integrally formed with a member defining said space.

10. The disk apparatus as claimed in claim 9, wherein said contacting member contacts only a predetermined width of said non-recordable area.

11. A disc apparatus as defined in claim 1 further comprising said tray upon which said recording medium is mounted having a second contacting member for contacting said disk when said disk is disposed in a slanted position relative to a horizontal plane representing said normal position of rotation for said recording medium with the second contacting member being separated from the recording medium when the recording medium is not slanted relative to the horizontal plane.

12. The disk apparatus as claimed in claim 1, further comprising said tray adapted to support the recording medium, said tray moving relative to the cover with the tray in a driving state when the recording medium is driven and in an exchanging state when the recording medium is exchanged, wherein said contacting member protruding from said cover faces the annular non-recording portion contiguous to the rim of said recording medium when said tray is in said driving state, and said contacting member does not face the annular non-recording portion contiguous to the rim of said recording medium when said tray is in said exchanging state.

13. A disk apparatus for rotationally driving a disk-shaped recording medium in a plane of rotation defining a normal position, with said recording medium having an outermost area containing a non-recordable portion comprising:

a tray situated under said recording medium when said recording medium is rotated;

a cover situated above said recording medium when said recording medium is rotated;

a space formed between said tray and said cover in which said recording medium is rotatably supported when said recording medium is loaded in said disk apparatus; and a contacting member separated from the recording medium when said recording medium is rotating in said normal position, said contacting member protruding from said cover into said space so that said contacting member faces the outermost area of a surface of said recording medium when said recording medium is rotated in said space and is in an arrangement in juxtaposition with said outermost area to cause contact to occur between said contacting member and said outermost area of the recording medium when said recording medium is warped such that the plane of rotation of the recording medium deviates from the normal position and;

wherein said contacting member upon making contact with said outermost annular area prevents an area of the surface of said recording medium other than said outermost annular area from contacting said cover.

14. The disk apparatus as claimed in claim 13, wherein said recording medium includes a recordable portion in which a recordable area is formed and an annular non-recordable portion defining an annular non-recordable area, wherein the outermost annular area of the surface of said recording medium is a surface of said non-recordable portion, and wherein said contacting member contacts a surface of said annular non-recordable portion when said recording medium being rotated is warped so that a surface of said recordable portion of said recording medium is prevented from contacting said at least one of said cover and said tray.

15. The disk apparatus as claimed in claim 14, wherein said contacting member is integrally formed with said cover.

16. The disk apparatus as claimed in claim 15, wherein said cover is made of a metal plate.

17. The disk apparatus as claimed in claim 16, wherein said contacting member is a bead formed on said cover.

18. The disk apparatus as claimed in claim 13, wherein said tray is adapted to support the recording medium, and wherein said tray moves relative to said cover in a driving state when the recording medium is driven and in an exchanging state when the recording medium is exchanged.

19. The disk apparatus as claimed in claim 18, wherein said contacting member protrudes from said cover into said space and faces said annular non-recording portion contiguous to the rim of said recording medium when said tray is in said driving state and does not face said annular non-recording portion when said tray moves relative to said cover in said exchanging state.

20. The disk apparatus as claimed in claim 13, wherein said contacting member protrudes from said tray.

21. The disk apparatus as claimed in claim 20, wherein said contacting member is integrally formed with said tray.

22. The disk apparatus as claimed in claim 13, wherein said contacting member protrudes to an extent such that upon making contact with said outermost area, said cover is prevented from contacting the surface of said recording medium other than on said outermost annular area.

* * * * *